United States Patent [19]
Matsumoto et al.

[11] Patent Number: 6,100,365
[45] Date of Patent: Aug. 8, 2000

[54] SOLUBLE POLYIMIDE RESIN, PROCESS FOR PREPARING THE SAME, AND POLYIMIDE RESIN SOLUTION COMPOSITION

[76] Inventors: Toshihiko Matsumoto, 3012-39, Iiyama, Atsugi-shi, Kanagawa 243-02; Toshikazu Kurosaki, 1-26-12, Fujihonmachi, Kokubunji-shi, Tokyo 185; Shin Irie, 1-2-8-205, Kasuga, Chuo-ku, Chiba 260; Masaaki Kudo, 6992, Goi, Ichihara-shi, Chiba 290; Yoshiharu Ito, 122-4, Nozomino, Sodeguara-shi, Chiba 299-02; Masao Kaneko, 1-3-2-401, Satsukidaira, Misato-shi, Saitama 341, all of Japan

[21] Appl. No.: 09/125,852
[22] PCT Filed: Dec. 25, 1997
[86] PCT No.: PCT/JP97/04820
   § 371 Date: Apr. 12, 1999
   § 102(e) Date: Apr. 12, 1999
[87] PCT Pub. No.: WO98/29471
   PCT Pub. Date: Jul. 9, 1998

[30] Foreign Application Priority Data

Dec. 27, 1996 [JP] Japan ..................... 8-358731
Aug. 27, 1997 [JP] Japan ..................... 9-246122

[51] Int. Cl.[7] .......................... C08G 73/10; C08G 69/28; C08L 79/08
[52] U.S. Cl. ............................ 528/170; 528/26; 528/28; 528/38; 528/125; 528/128; 528/172; 528/173; 528/174; 528/171; 528/183; 528/185; 528/188; 220/220; 220/229; 220/350; 220/353; 524/600; 524/606

[58] Field of Search ................... 528/26, 28, 38, 528/353, 125, 128, 171, 172, 173, 179, 183, 185, 188, 220, 229, 350; 524/600, 606

[56] References Cited

U.S. PATENT DOCUMENTS 5,807,961   9/1998   Sawai et al. ........................ 528/353

FOREIGN PATENT DOCUMENTS 1249122   10/1989   Japan .

*Primary Examiner*—P. Hampton-Hightower
*Attorney, Agent, or Firm*—Melvin I. Stoltz

[57] ABSTRACT

The present invention provides a novel soluble polyimide resin which is superior in solubility in solvents and transparency, which is useful particularly in electronics and optronics fields, and which has good processability; a process for production of the resin; and a solution composition of the resin. A soluble polyimide resin containing, as part or the whole of the diamine units, a 2,5(or 6)-bis(aminomethyl)bicyclo[2.2.1]heptane and having a light transmittance of 60% or more in a range of wavelength larger than 400 nm in an ultraviolet-visible light spectrum measured for a film of 10-$\mu$m thickness; a process for production of the resin; and a solution composition of the resin.

30 Claims, 15 Drawing Sheets

SOLUBLE POLYIMIDE RESIN, PROCESS FOR PREPARING THE SAME, AND POLYIMIDE RESIN SOLUTION COMPOSITION

TECHNICAL FIELD

The present invention relates to a polyimide resin which is soluble in solvents and high in transparency, a process for production of the resin, and a polyimide resin solution composition, and is useful particularly in electronics and optronics fields.

BACKGROUND ART

Polyimide resins are produced using, as raw materials, a diamine and an acid dianhydride. In general, aromatic compounds are used for both of the diamine and the acid dianhydride as raw materials, and the resulting aromatic polyimide resins are in wide use as a film, a coating, an adhesive, a composite material, a separation film, etc. for their high heat resistance. Many of these aromatic polyimide resins, however, are low in solubility in solvents; therefore, when they are used, for example, as a coating, it is impossible to coat them as they are and it is necessary to coat a solution of a polyamic acid (a precursor) and then heat the coated solution to give rise to imidization; thus, aromatic polyimide resins have had poor processability.

Hence, various researches were made for improvement of polyimide resin. For example, in Japanese Patent Application Kokai (Laid-Open) No. 301958/1993 is disclosed a polyimide resin using, as raw materials, a tetracarboxylic acid dianhydride of a cross-linked hydrocarbon and a diamine having a cyclohexane ring; in Japanese Patent Application Kokai (Laid-Open) No. 157560/1995 is disclosed a polyimide resin block copolycondensate using an aromatic diamine as a raw material; in Japanese Patent Publication No. 5891/1996 is disclosed a polyimide resin using, as raw materials, a tetracarboxylic acid dianhydride of a cross-linked hydrocarbon and an aromatic diamine; and in Japanese Patent Application Kokai (Laid-Open) No. 208835/1996 is disclosed a polyimide resin block copolycondensate using, as a diamine raw material, tetrahydrodicyclopentadienylenediamine, hexahydro-4,7-methanoindanylenedimethylenediamine or the like.

These polyimide resins provided heretofore have excellent solubility, but have insufficient transparency and are unable to satisfy both of solubility and transparency.

The objects of the present invention lie in providing, by using a diamine of a particular cross-linked hydrocarbon as a raw material for polyimide resin, a polyimide resin which is soluble in solvents and high in transparency, a process for production of the resin, and a polyimide resin solution composition.

The present inventors made an intensive study in order to solvent the above problems. As a result, the present inventors found out that the above objects could be achieved by using, as the diamine, a 2,5(or 6)-bis(aminomethyl)bicyclo[2.2.1]heptane. The finding has led to the completion of the present invention.

The present inventors also found out that by using, as the diamine, two or more kinds of diamines containing, as an essential component, a 2,5(or 6)-bis(aminomethyl)bicyclo[2.2.1]heptane, not only the above objects could be achieved but also the resulting soluble copolycondensate polyimide resin had high adhesivity. The finding has led to the completion of the present invention.

DISCLOSURE OF THE INVENTION

The gists of the present invention lie firstly in a soluble polyimide resin containing, as essential diamine units, the units represented by the following formula [1]:

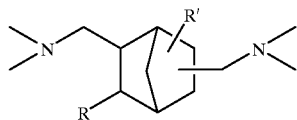

[1]

(wherein R and R' are each independently selected from a hydrogen atom, a methyl group and an ethyl group; and R' does not bond to the carbon atom to which an aminomethyl group bonds) and having:

a light transmittance of 60% or more in a range of wavelength larger than 400 nm in an ultraviolet-visible light spectrum measured for a film of 10-μm thickness, and a logarithmic viscosity number of 0.1 to 1.5; secondly in a process for producing a soluble polyimide resin containing, as essential diamine units, the units represented by the following formula [1]:

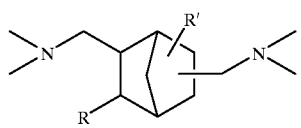

[1]

(wherein R and R' are each independently selected from a hydrogen atom, a methyl group and an ethyl group; and R' does not bond to the carbon atom to which an aminomethyl group bonds), which process comprises reacting:

(i) a 2,5(or 6)-bis(aminomethyl)bicyclo[2.2.1]heptane represented by t he following formula [2]:

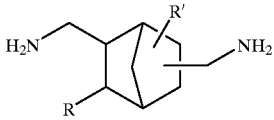

[2]

(wherein R and R' are each independently selected from a hydrogen atom, a methyl group and an ethyl group; and R' does not bond to the carbon atom to which an aminomethyl group bonds), and (ii) a tetracarboxylic acid dianhydride, or reacting:

(i) a 2,5(or 6)-bis(aminomethyl)bicyclo[2.2.1]heptane represented by the formula [2], (ii) a tetracarboxylic acid dianhydride, and (iii) a diamine represented by the following formula [3]:

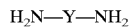

$H_2N-Y-NH_2$ [3]

[wherein Y is at least one group selected from the group consisting of bivalent aliphatic groups, bivalent alicyclic groups other than bivalent groups represented by the following formula [4]:

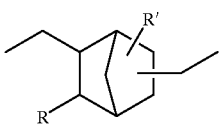

[4]

(wherein R and R' are each independently selected from a hydrogen atom, a methyl group and an ethyl group; and R' does not bond to the carbon atom to which an aminomethyl group bonds), bivalent aromatic groups and bivalent siloxane groups]; and thirdly in a polyimide resin solution composition comprising, as essential components, the above-mentioned polyimide resin and an organic polar solvent.

BEST MODE FOR CARRYING OUT THE INVENTION

Figure 1:
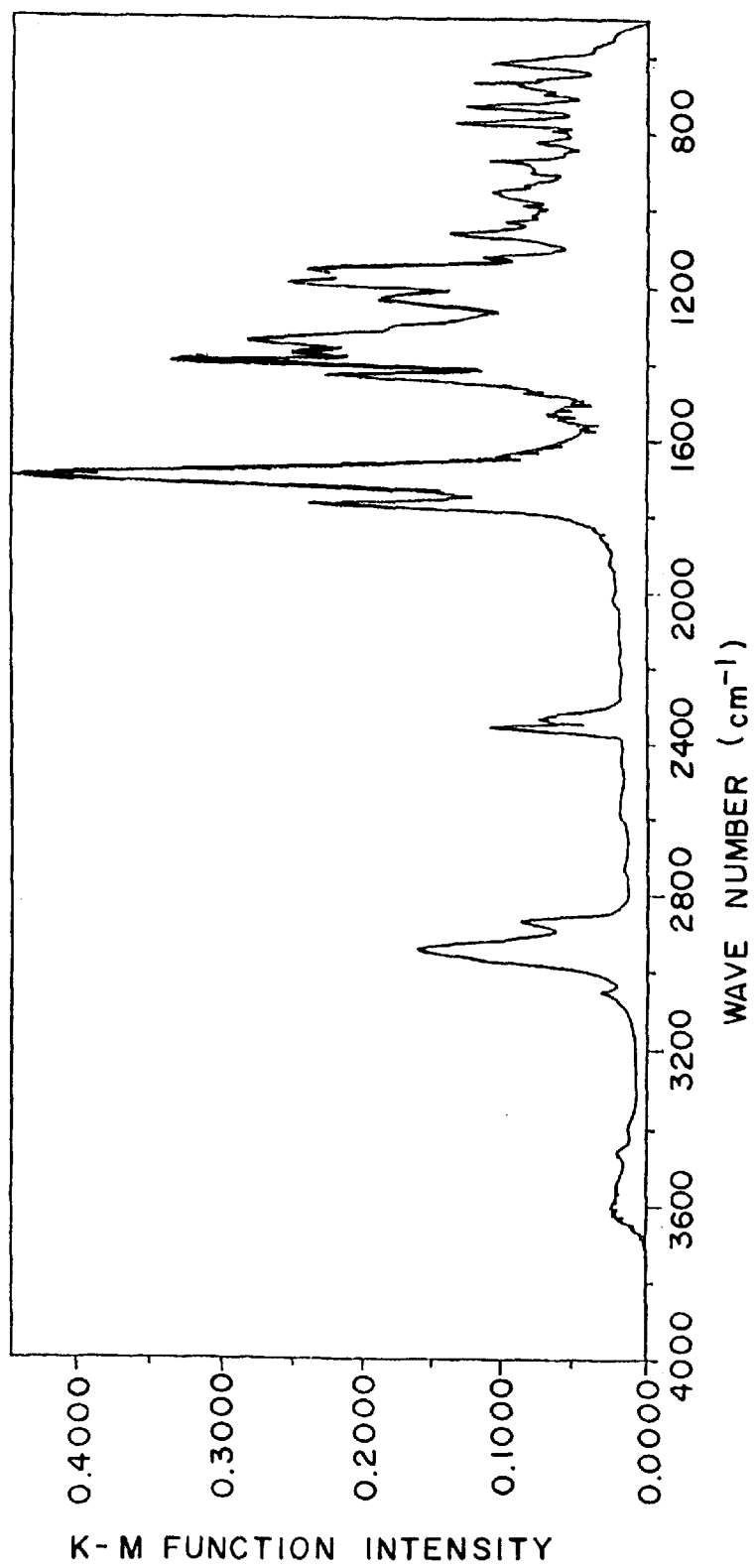
FIG. 1 is an IR spectrum of the soluble polyimide resin obtained in Example 1.

In the present invention, a 2,5(or 6)-bis (aminomethyl) bicyclo[2.2.1]heptane represented by the formula [2] is used as the diamine which is a raw material of the soluble polyimide resin. In the formula [2], R and R' are each independently selected from a hydrogen atom, a methyl group and an ethyl group, and R' does not bond to the carbon atom to which an aminomethyl group bonds.

In the present invention, of those compounds represented by the formula [2], 2,5(or 6)-bis(aminomethyl)bicyclo [2.2.1]heptane (which is a compound of the formula [2] wherein R and R' are each a hydrogen atom) or a compound of the formula [2] wherein R and/or R' are/is a methyl group, is used preferably. 2,5(or 6)-Bis(aminomethyl)bicyclo [2.2.1]heptane is used particularly preferably. In the formula [2], the expression of "2,5(or 6)-" is used because the 2,5-substitution product and the 2,6-substitution product are isomers each other and very difficult to separate from each other, and because they are ordinarily used in admixture.

In the present invention, in addition to the above diamine, at least one other diamine represented by the following formula [3]:

$$H_2N-Y-NH_2 \qquad [3]$$

can be used to give rise to copolycondensation, as long as the solubility of the resulting polyimide resin is not impaired. In the formula [3], Y is at least one group selected from the group consisting of bivalent aliphatic groups, bivalent alicyclic groups other than bivalent groups represented by the following formula [4]:

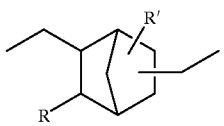

[4]

bivalent aromatic groups and bivalent siloxane groups. In the formula [4], R and R' are the same as the R and R' of the formula [2].

As the other diamine represented by the formula [3], there can be mentioned known aliphatic diamines, alicyclic diamines, aromatic diamines, diaminosiloxanes, etc. As the aliphatic diamines, there can be mentioned, for example, tetramethylenediamine, hexamethylenediamine, octamethylenediamine and dodecamethylenediamine; as the alicyclic diamines, there can be mentioned, for example, cyclohexylenediamine and cyclooctylenediamine; as the aromatic diamines, there can be mentioned, for example, phenylenediamine, 3,4'-diaminodiphenyl ether, 4,4'-diaminodiphenyl ether, 2,2-bis[(4-aminophenoxy)phenyl] propane, bis[4-(3-aminophenoxy)phenyl]sulfone and 2,2-bis(4-aminophenyl)-1,1,1,3,3,3-hexafluoropropane. In general, use of an asymmetric aromatic diamine, as compared with use of a symmetric aromatic diamine, gives a soluble polyimide resin having higher solubility in solvents.

As the diaminosiloxanes which are also other diamines, there can be mentioned, for example, aliphatic diaminosiloxanes represented by the following general formula [5]:

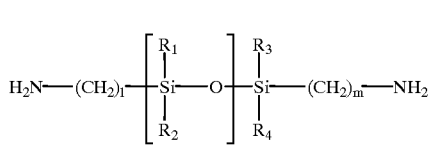

[5]

(wherein $R_1$, $R_2$, $R_3$ and $R_4$ are each a methyl group or a phenyl group; 1 and m are each an integer of 1 to 10; and n is an integer of 1 to 20).

The other diamines can be used in one kind or in two or more kinds. There is no particular restriction as to the proportion of the other diamine(s) used, but the other diamine (s) is (are) used in an amount of generally 70 mole % or less, preferably 3 to 70 mole %, more preferably 3 to 50 mole % based on the total diamines.

As the tetracarboxylic acid dianhydride which is another raw material, there can be mentioned aliphatic tetracarboxylic acid dianhydrides, alicyclic tetracarboxylic acid dianhydrides, and aromatic tetracarboxylic acid dianhydrides. Aliphatic tetracarboxylic acid dianhydrides and alicyclic tetracarboxylic acid dianhydrides are preferred. In general, use of an alicyclic tetracarboxylic acid dianhydride gives a product of excellent transparency, and use of an aromatic tetracarboxylic acid dianhydride gives a product of slight coloring tendency but excellent heat resistance. Considering that aliphatic tetracarboxylic acid dianhydrides tend to give a product of excellent transparency but poor heat resistance, in order to obtain a product having both transparency and heat resistance by using the diamine of the formula [2] and the diamine of the formula [3] in combination, use of at least one alicyclic tetracarboxylic acid dianhydride is preferred and use of at least one alicyclic tetracarboxylic acid dianhydride and an aromatic tetracarboxylic acid dianhydride is more preferred.

The tetracarboxylic acid dianhydride is specifically represented by the following formula [6]:

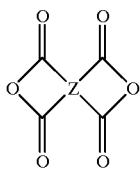

[6]

(wherein Z is a tetravalent organic group having four or more carbon atoms and there is no case that a plurality of —CO— groups bond to one of the carbon atoms of Z).

More specifically, as aliphatic tetracarboxylic acid dianhydrides, there can be mentioned, for example, butane-1,2,3,4-tetracarboxylic acid dianhydride and pentane-1,2,4,5-tetracarboxylic acid dianhydride; as alicyclic tetracarboxylic acid dianhydrides, there can be mentioned, for example, cyclobutanetetracarboxylic acid dianhydride, cyclopentane-1,2,3,4-tetracarboxylic acid dianhydride, cyclohexane-1,2,4,5-tetracarboxylic acid dianhydride, cyclohexa-1-ene-2,3,5,6-tetracarboxylic acid dianhydride, 3-ethylcyclohexa-1-ene-3-(1,2),5,6-tetracarboxylic acid dianhydride, 1-methyl-3-ethylcyclohexane-3-(1,2),5,6-tetracarboxylic acid dianhydride, 1-methyl-3-ethylcyclcohexa-1-ene-3-(1,2),5,6-tetracarboxylic acid dianhydride, 1-ethylcyclohexane-1-(1,2),3,4-tetracarboxylic acid dianhydride, 1-propylcyclohexane-1-(2,3),3,4-tetracarboxylic acid dianhydride, 1,3-dipropylcyclohexane-1-(2,3),3-(2,3)-tetracarboxylic acid dianhydride, dicyclohexyl-3,4,3',4'-tetracarboxylic acid dianhydride, bicyclo[2.2.1]heptane-2,3,5,6-tetracarboxylic acid dianhydride, bicyclo[2.2.2]octane-2,3,5,6-tetracarboxylic acid dianhydride and bicyclo[2.2.2]octo-7-ene-2,3,5,6-tetracarboxylic acid dianhydride; as aromatic tetracarboxylic acid dianhydrides, there can be mentioned, for example, 3,3',4,4'-diphenyl ether tetracarboxylic acid dianhydride, 3,3',4,4'-biphenyltetracarboxylic acid dianhydride, 3,3',4,4'-benzophenonetetracarboxylic acid dianhydride, 1,4,5,8-naphthalenetetracarboxylic acid dianhydride, 2,3,6,7-naphthalene tetracarboxylic acid dianhydride, 2,2-bis(3,4-dicarboxyphenyl)propane dianhydride, 2,2-bis[4-(3,4-dicarboxyphenoxy)phenyl]propane dianhydride, 1,4-bis(3,4-dicarboxyphenoxy)benzene dianhydride and pyromellitic acid dianhydride.

In many of these tetracarboxylic acid dianhydrides, there are isomers of trans type and cis type with respect to the bonding of two acid dianhydride groups. These isomers are ordinarily expressed in one term except a case that the two isomers need be separated, and the two isomers are not separated from each other and can be used in admixture.

The above-mentioned aliphatic, alicyclic and aromatic tetracarboxylic acid dianhydrides can be used singly or in admixture of two or more kinds, depending upon the application purpose. Use of an aliphatic or alicyclic tetracarboxylic acid dianhydride(s) can give a polyimide resin highly excellent in transparency.

In the present invention, by selecting the diamine (or the diamine and the other diamine) and the tetracarboxylic acid dianhydride, the resulting polyimide resin can have a light transmittance of 60% or more in a range of wavelength larger than 400 nm, i.e. a visible light range and an infrared range in an ultraviolet-visible light absorption spectrum measured for a 10 μm-thick film. Since light transmittance is higher as wavelength is larger, it is a common knowledge to those skilled in the art that when the light transmittance at 400 nm is 60% or more, the light transmittance at a wavelength larger than 400 nm is 60% or more.

When the light transmittance is above about 60%, a considerable part of the loss is caused by the light reflection on surface, and the change in film thickness gives substantially no effect on transmittance as long as the film thickness is in a range of 10 to 15 μm. In Examples which follow, film thickness is 10 μm or more; therefore, it is apparent that the transmittance in film thickness of 10 μm becomes the values shown in Examples or even higher.

Of the polyimide resins of the present invention, the polyimide resins of combined diamines type obtained from the diamine, the other diamine and the tetracarboxylic acid dianhydride, generally have a glass transition temperature of 210 to 320° C. as measured by the DSC method, and a 5% weight decrease temperature of 420 to 460° C. as measured by the TG method (thermogravimetric method).

As the reaction solvent used in the present invention, there can be mentioned organic polar solvents such as phenol type solvents, aprotic polar solvents and the like. As the phenol type solvents, there can be mentioned phenol, 4-methoxyphenol, 2,6-dimethylphenol, m-cresol, etc. The aprotic polar solvents can be exemplified by N-methylpyrrolidone (hereinafter abbreviated to NMP), N,N-dimethylformamide (hereinafter abbreviated to DMF), N,N-dimethylacetamide (hereinafter abbreviated to DMAc), dimethyl sulfoxide (hereinafter abbreviated to DMSO), γ-butyrolactone, γ-valerolactone, chloroform, tetrahydrofuran (hereinafter abbreviated to THF), cyclohexanone, dioxane, anisole, 2-methoxyethanol, methyl methoxypropionate and ethyl lactate.

The above reaction solvents can be used singly or in admixture. Combined use of the above solvent(s) with an aromatic hydrocarbon such as benzene, toluene, xylene or tetralin is preferred because it is effective to remove the water generated in imidization, by azeotropy.

The production of polyimide resin from diamine and tetracarboxylic acid dianydride can be conducted using the diamine and the tetracarboxylic acid dianhydride in nearly equimolar amounts, according to a generally known one-step polymerization of conducting synthesis only at a high temperature, or according to a two-step polymerization of firstly synthesizing an amic acid at a low temperature and then conducting imidization at a high temperature.

In the one-step polymerization, the reaction temperature is 120 to 350° C., preferably 150 to 300° C.; and the reaction time is 0.5 to 20 hours, preferably 1 to 15 hours. In the two-step polymerization, the synthesis of polyamic acid is conducted at 0 to 120° C., preferably at 15 to 120° C., more preferably at 80 to 110° C. for 0.5 to 100 hours, preferably 1 to 100 hours; then, the imidization is conducted at 120 to 350° C., preferably at 150 to 300° C. for 0.5 to 20 hours, preferably 1 to 10 hours.

Even when at least either of the diamine and the tetracarboxylic acid dianhydride is used in a plurality of kinds, there is no particular restriction as to the reaction method for production of polyimide resin. There can be used, for example, a method of first mixing all raw materials and then conducting copolycondensation, or a method of reacting one kind of diamine and one kind of tetracarboxylic acid dianhydride and then adding the remaining kind(s) of raw material(s) one by one in order. When a random copolycondensate polyimide resin is obtained, the former method is suitable; when a block copolycondensate polyimide resin is obtained, the latter method is suitable. The reaction temperature is 120 to 350° C., preferably 120 to 300° C., and the reaction time is 0.5 to 20 hours, preferably 1 to 15 hours; under these conditions, the reaction is conducted in one step, or in a plurality of steps when there is a necessity of avoiding a violent reaction.

The thus-obtained solution of the present soluble polyimide resin can be used as such, or can be subjected to solvent removal to obtain a soluble polyimide resin of solid form. Further, a purified soluble polyimide resin can be obtained by, for example, adding a poor solvent to the above polyimide resin solution to give rise to reprecipitation. It is also possible to obtain a purified soluble polyimide resin solution composition for use as such, by redissolving the purified polyimide resin obtained by reprecipitation, in at least one organic polar solvent (e.g. phenol type solvent or aprotic polar solvent) used in the above reaction for polyimide production.

Needless to say, it is possible to conduct a reaction at a relatively low temperature as necessary, terminate the reaction at a timing that a polyamic acid has been formed, and take out the polyamic acid.

In the above-mentioned two-step polymerization, a polyamic acid of high polymerization degree can generally be obtained by conducting the first step of polyamic acid synthesis at high temperatures, and imidization thereof can produce a polymer of high imidization degree. This polymer of high imidization degree is superior particularly in toughness.

In the imidization, water is generated by cyclization of amic acid. It is preferred to remove the water out of the reaction system by azeotropy with benzene, toluene, xylene, tetralin or the like to promote imidization. The imidization can be allowed to proceed easily by the use of a dehydrating agent such as acetic anhydride.

As necessary, a polycondensation promotor can be added to the reaction system to complete the reaction quickly. The polycondensation promotor can be exemplified by a basic polycondensation promotor and an acidic polycondensation promotor. These two kinds of polycondensation promotors may be used in combination. AS the basic polycondensation promotor, there can be mentioned, for example, N-dimethylaniline, N,N-diethylaniline, pyridine, quinoline, isoquinoline, α-picoline, β-picoline, γ-picoline, 2,4-lutidine, triethylamine, tributylamine, tripentylamine and N-methylmorpholine. As the acidic polycondensation promotor, there can be mentioned, for example, benzoic acid, o-hydroxybenzoic acid, m-hydroxybenzoic acid, p-hydroxybenzoic acid, 2,4-dihydroxybenzoic acid, p-hydroxyphenylacetic acid, 4-hydroxyphenylpropionic acid, phosphoric acid, p-phenolsulfonic acid, p-toluenesulfonic acid and crotonic acid.

The amount of the polycondensation promotor used is 1 to 50 mole %, preferably 5 to 35 mole % based on the diamine or the combined diamines. Use of the polycondensation promotor makes it possible to use a lower reaction temperature. As a result, not only the side reaction by heating (believed to cause frequent coloring) can be prevented, but also the reaction time can be significantly shortened (this offers improved economy).

The thus-obtained soluble polyimide resin of the present invention contains, as essential diamine units, the units represented by the following formula [1]:

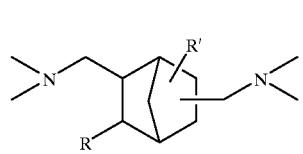

that is, contains, as the whole or part of the diamine units, a 2,5(or 6)-bis(aminomethyl)bicyclo[2.2.1]heptane represented by the following formula [2]:

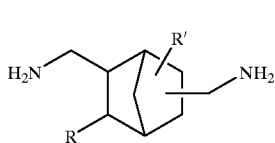

and has:

a light transmittance of 60% or more in a range of wavelength larger than 400 nm in an ultraviolet-visible light spectrum measured for a film of 10-μm thickness, and a logarithmic viscosity number of 0.1 to 1.5.

Specifically, when a diamine represented by the formula [1] and a tetracarboxylic acid dianhydride represented by the above-mentioned formula [6] are reacted, a soluble polyimide resin can be obtained which has the repeating units represented by the following formula [7]:

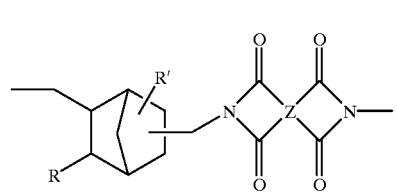

(wherein R, R' and Z have the same definitions as given above and the position of bonding of R' is the same as mentioned above). When a diamine represented by the formula [1], other diamine represented by the above-mentioned formula [3] and a tetracarboxylic acid dianhydride represented by the formula [6] are reacted, a soluble polyimide resin of combined diamines type can be obtained which contains the repeating units represented by the formula [7] and the repeating units represented by the following formula [8]:

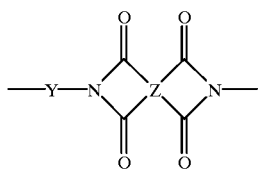

[8]

(wherein Y and Z have the same definitions as given above).

In the soluble polyimide resin of combined diamines type, the proportion of the repeating units represented by the formula [7] is generally 30 mole % or more, preferably 30 to 97 mole %, more preferably 50 to 97 mole % of the total repeating units.

The soluble polyimide resin of the present invention retains the heat resistance inherently possessed by polyimide resins, is soluble in solvents, and has:

a light transmittance of 60% or more in a range of wavelength larger than 400 nm in an ultraviolet-visible light spectrum measured for a film of 10-$\mu$m thickness, and a logarithmic viscosity number of 0.1 to 1.5 dl/g, ordinarily 0.1 to 1.0 dl/g as measured at 0.5 g/dl at 30° C. in N-methylpyrrolidone.

The present polyimide resin superior in transparency is useful in an electronics field as a coating for electronic parts (e.g. IC), or in an optronics field as a liquid crystal alignment layer, a protective film for color filter, an electronic switch of optical response system, a material for device for optical fiber branching, etc.

When an aliphatic tetracarboxylic acid dianhydride or an alicyclic tetracarboxylic acid dianhydride is used as the acid dianhydride, a polyimide resin can be obtained which has a high light transmittance which has been unobtainable heretofore, in a wavelength range particularly of 300 nm or smaller of ultraviolet absorption spectrum. Such a polyimide resin is useful particularly in a field associated with recording or memory medium.

When using combined diamines, the resulting polyimide resin can have high adhesivity. When using a diaminosiloxane as the other diamine, the resulting polyimide resin can be soluble in low-boiling solvents such as cyclohexanone, dioxane, ethyl lactate and the like while retaining transparency and heat resistance, making it possible to use a lower heating temperature when made into a film; and moreover can form a film having high adhesivity even to silicon wafer. Further, the polyimide resin of the present invention can be processed into a film superior in flexibility.

The present invention is described in more detail below by way of the following Examples. However, the scope of the present invention is in no way restricted by these Examples.

In the following Examples, "glass transition temperature" (DSC method) and "5% weight decrease temperature" were measured using "DSC 220C" and "TG/DTA 220" (products of Seiko Instruments Inc.), respectively.

"Light transmittance" was measured using "U-2000 Type Double-Beam Spectrophotometer" (a product of Hitachi, Ltd.).

"IR spectrum" was measured by a diffuse reflection method, using "JIR-3510", a spectroscope manufactured by Japan Electron Optics Laboratory. Incidentally, the absorption at around 2,300 to 2,400 cm$^{-1}$ is of the carbon dioxide present in the measurement atmosphere.

"Logarithmic viscosity number" was determined by dissolving 0.5 g of a polyimide resin powder in 100 ml of N-methylpyrrolidone (hereinafter abbreviated to NMP) or N,N-dimethylacetamide (hereinafter abbreviated to DMAc), measuring the viscosity of the resulting solution in a thermostat of 30±0.1° C. using an Ubbelohde's viscometer and making calculation using the following formula:

logarithmic viscosity number=[ln($t/t0$)]/0.5 wherein "t" is the dropping time of polyimide resin solution and "t0" is the dropping time of NMP or DMAc.

"Adhesivity test" was conducted by a cross-cut tape method based on JIS K 5400. The intervals of parallel lines cutting were 1 mm; the number of squares formed by cross-cutting was 100; the test plate was a mild steel plate (70 mm×150 mm×0.8 mm); the evaluation standard was 0 (worst) and 10 (best) (no peeling).

"Solubility test" was conducted at a concentration of 10% by weight at 20° C., using the following 23 kinds of solvents in all Examples. Of these solvents, only those in which the polyimide resin of the present invention was soluble, are shown in the Examples.

Chloroform, DMSO, DMF, DMAc, NMP, γ-butyrolactone, γ-valerolactone, cyclohexanone, dioxane, THF, anisole, 2-methoxyethanol, propylene glycol monomethyl ether acetate (hereinafter abbreviated to PGMEA), methyl methoxypropionate (hereinafter abbreviated to MMP), ethyl lactate, ethyl acetate, methyl ethyl ketone, diethyl ether, benzene, toluene, xylene, m-cresol and pyridine

EXAMPLE 1

In a reactor were placed 2.482 g (10 mmol) of bicyclo [2.2.2]octo-7-ene-2,3,5,6-tetracarboxylic acid dianhydride (hereinafter abbreviated to BCD), 10 ml of DMAc, 3.0 ml of toluene, 801 mg of crotonic acid and 791 mg of pyridine. The mixture was heated to 100° C. Thereto was dropwise added 1.542 g (10 mmol) of 2,5(or 6)-bis(aminomethyl) bicyclo[2.2.1]heptane (hereinafter abbreviated to NBDA) (a product of Mitsui Toatsu Chemicals, Ltd.). A reaction was conducted at 100° C. for 30 minutes and then at 170° C. for 3 hours. The reaction mixture was cooled and poured in a large amount of acetone for reprecipitation and purification. The precipitate was dried to obtain 3.61 g of a white powder. This corresponds to a yield of 89.7% by weight based on the total weight of BCD and NBDA used. Since the total weight decreases by about 9% owing to dehydration as imidization proceeds, the molar yield becomes 98.6%, indicating that the reaction proceeded almost completely.

The polyimide resin obtained was composed of the repeating units of the following formula [9].

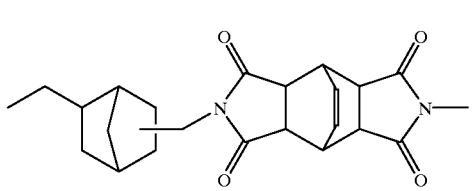

[9]

$C_{21}H_{22}N_2O_4$; Calculated: C=68.84, H=6.05, N=7.65; Measured: C=68.81, H=6.07, N=7.62.

The polyimide resin was soluble in chloroform, DMSO, DMF, DMAc, NMP, γ-butyrolactone, γ-valerolactone, cyclohexanone, ethyl lactate, m-cresol and pyridine, and had a glass transition temperature of 294° C., a 5% weight decrease temperature of 422° C. and a logarithmic viscosity number of 0.19 (0.5 g/dl, NMP).

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 18 μm) had a light transmittance of 71.8% at 280 nm, 75.3% at 300 nm and 88.0% at 400 nm. The result of adhesivity test was 10. The IR spectrum of the polyimide resin is shown in FIG. 1.

2947 cm$^{-1}$: CH stretching; 2359 cm$^{-1}$: C=C stretching; 1769, 1703 cm$^{-1}$: imide C=O stretching.

EXAMPLE 2

In a reactor were placed 6.205 g (25 mmol) of BCD, 13 ml of γ-butyrolactone, 4 ml of toluene and 791 mg of N-methylmorpholine. Thereto was dropwise added 3.856 g (25 mmol) of NBDA. The resulting mixture was subjected to a reaction at 100° C. for 30 minutes and then at 170° C. for 3 hours. The reaction mixture was cooled and poured into a large amount of methanol for reprecipitation. The precipitate was collected by filtration and dried to obtain 9.15 g of a white powder. This corresponds to a yield of 99.9 mole %.

The polyimide resin obtained was composed of the same repeating units as shown in Example 1.

$C_{21}H_{22}N_2O_4$; Calculated: C=68.84, H=6.05, N=7.65; Measured: C=68.74, H=6.11, N=7.58.

The polyimide resin was soluble in chloroform, DMSO, DMF, DMAc, NMP, γ-butyrolactone, γ-valerolactone, cyclohexanone, ethyl lactate, m-cresol and pyridine, and had a glass transition temperature of 291° C., a 5% weight decrease temperature of 421° C. and a logarithmic viscosity number of 0.24 (0.5 g/dl, NMP).

The polyimide resin film (thickness: 16 μm) obtained in the same manner as in Example 1 had a light transmittance of 82.7% at 280 nm, 90.2% at 300 nm and 92.3% at 400 nm. The result of adhesivity test was 10.

EXAMPLE 3

A reaction and purification were conducted in the same manner as in Example 2 except that 5.253 g (25 mmol) of cyclopentane-1,2,3,4-tetracarboxylic acid dianhydride was used in place of the BCD used in Example 2, whereby 7.91 g of a polyimide resin was obtained as a white powder. This corresponds to a yield of 96.4 mole %.

The polyimide resin obtained was composed of the repeating units of the following formula [10].

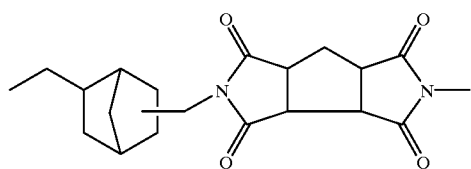

[10]

$C_{18}H_{20}N_2O_4$; Calculated: C=65.84, H=6.14, N=8.53; Measured: C=65.58, H=6.24, N=8.46.

The polyimide resin was soluble in DMSO, DMF, DMAc, NMP, γ-butyrolactone, γ-valerolactone, cyclohexanone, ethyl lactate, m-cresol and pyridine, and had a glass transition temperature of 262° C., a 5% weight decrease temperature of 385° C. and a logarithmic viscosity number of 0.22 (0.5 g/dl, NMP).

Figure 2:
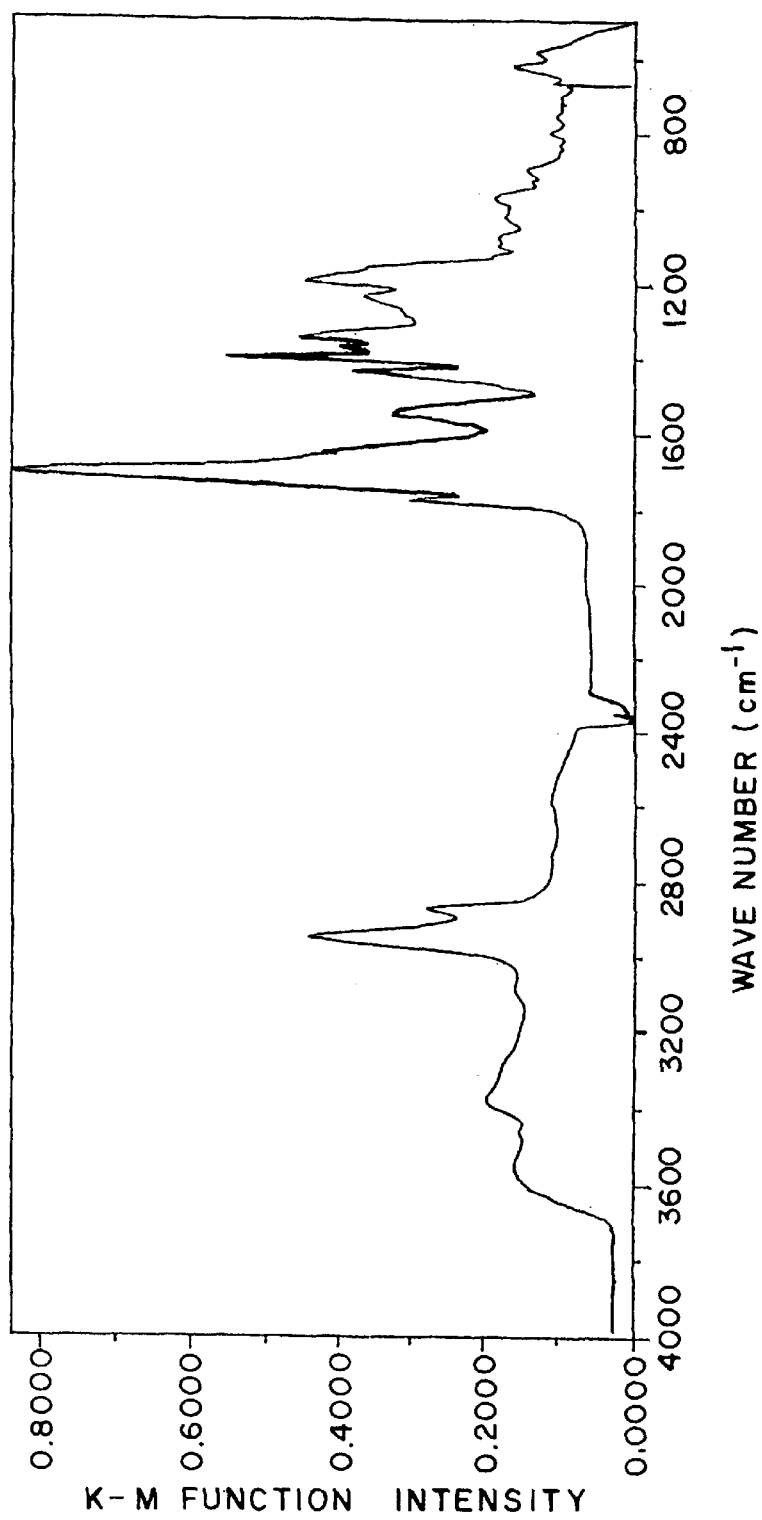
FIG. 2 is an IR spectrum of the soluble polyimide resin obtained in Example 3.

The polyimide resin film (thickness: 18 μm) obtained in the same manner as in Example 1 had a light transmittance of 70.2% at 280 nm, 87.4% at 300 nm and 91.5% at 400 nm. The result of adhesivity test was 10. The IR spectrum of the polyimide resin is shown in FIG. 2.

2949 cm$^{-1}$: CH stretching; 1774, 1703 cm$^{-1}$: imide C=O stretching.

EXAMPLE 4

In a reactor were placed 62.0 ml of DMAc and 9.36 g (40 mmol) of bicyclo[2.2.1]heptane-2,3,5,6-tetracarboxylic acid dianhydride to obtain a complete solution. Thereto was gradually added 5.84 g (40 mmol) of NBD to give rise to a reaction. The reaction mixture was heated to 60 to 80° C., followed by stirring for 48 hours. Part of the polyamic acid polymer solution obtained was coated on a glass plate. The coated glass plate was treated in a nitrogen atmosphere at 80° C. for 1 hour and then at 250° C. for 2 hours, after which the resulting material was immersed in water to obtain a polyimide resin film (thickness: 18 μm). The film had a light transmittance of 70.8% at 280 nm, 86.9% at 300 nm and 91.7% at 400 nm.

5.0 g of the polyamic acid solution after the reaction was dropwise added to 100 ml of acetone to give rise to reprecipitation. The precipitate was collected by filtration using a glass filter to obtain a polyamic acid of powdery form. This polyamic acid powder was heated at 250° C. for 4 hours under reduced pressure to obtain 1.0 g of a polyimide resin of powdery form.

The polyimide resin obtained was composed of the repeating units of the following formula [11].

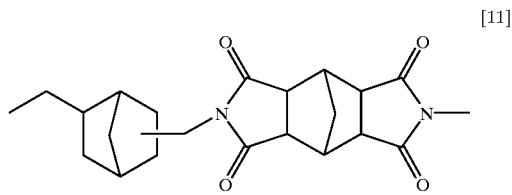

[11]

$C_{20}H_{22}N_2O_4$; Calculated: C=67.78, H=6.26, N=7.90; Measured: C=67.71, H=6.35, N=7.76.

The polyimide resin was soluble in DMSO, DMF, DMAc, NMP, γ-butyrolactone, γ-valerolactone, cyclohexanone, ethyl lactate, m-cresol and pyridine, and had a glass transition temperature of 264° C., a 5% weight decrease temperature of 439° C., a logarithmic viscosity number of 0.21 (0.5 g/dl, DMAc) and a permittivity of 2.7. The result of adhesivity test was 10.

EXAMPLE 5

A reaction was conducted in the same manner as in Example 4 except that 9.92 g (40 mmol) of bicyclo[2.2.2]octane-2,3,5,6-tetracarboxylic acid dianhydride was used in place of the bicyclo[2.2.1]heptane-2,3,5,6-tetracarboxylic acid dianhydride (9.36 g) used in Example 4, whereby a polyamic acid solution and a polyimide resin were obtained.

The polyimide resin obtained was composed of the repeating units of the following formula [12].

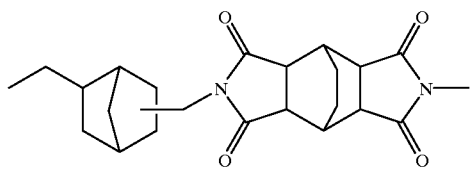

[12]

$C_{21}H_{24}N_2O_4$; Calculated: C=68.46, H=6.57, N=7.60; Measured: C=68.17, H=6.67, N=7.53.

The polyimide resin was soluble in chloroform, DMSO, DMF, DMAc, NMP, γ-butyrolactone, γ-valerolactone, cyclohexanone, ethyl lactate, m-cresol and pyridine, and had a glass transition temperature of 258° C., a 5% weight decrease temperature of 436° C. and a logarithmic viscosity number of 0.19 (0.5 g/dl, DMAc).

The polyimide resin film (thickness: 15 μm) obtained in the same manner as in Example 1 had a light transmittance of 71.7% at 280 nm, 88.3% at 300 nm and 91.0% at 400 nm. The result of adhesivity test was 10.

EXAMPLE 6

A reaction was conducted in the same manner as in Example 4 except that 10.57 g (40 mmol) of 1-methyl-3-ethylcyclo hexane-1-ene-3-(1,2),5,6-tetracarboxylic acid dianhydride was used in place of the bicyclo[2.2.1]heptane-2,3,5,6-tetracarboxylic acid dianhydride (9.36 g) used in Example 4, whereby a polyamic acid solution and a polyimide resin were obtained.

The polyimide resin obtained was composed of the repeating units of the following formula [13].

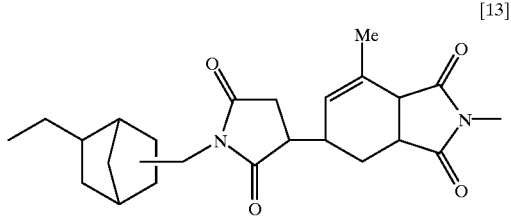

[13]

$C_{22}H_{26}N_2O_4$;

Calculated: C=69.09, H=6.85, N=7.32; Measured: C=68.79, H=6.97, N=7.25.

The polyimide resin was soluble in DMSO, DMF, DMAc, NMP, γ-butyrolactone, γ-valerolactone and pyridine, and had a glass transition temperature of 209° C., a 5% weight decrease temperature of 424° C. and a logarithmic viscosity number of 0.1 (0.5 g/dl, DMAc).

The polyimide resin film (thickness: 12 μm) obtained in the same manner as in Example 1 had a light transmittance of 41.5% at 280 nm, 48.2% at 300 nm and 88.0% at 400 nm. The result of adhesivity test was 10.

EXAMPLE 7

In a reactor were placed 60.0 ml of NMP and 9.84 g (40 mmol) of BCD to obtain a complete solution. The solution was heated to 80° C. Thereto was gradually added 5.84 g (40 mmol) of NBDA to give rise to a reaction. The reaction was continued for a further 1 hour at 80° C. Toluene was added and the resulting mixture was heated to 190° C., followed by stirring for 8 hours, to obtain a polyimide resin solution composition. A polyimide resin and a polyimide resin film (thickness: 15 μm) were obtained in the same manner as in Example 1. The polyimide resin was composed of the same repeating units as shown in Example 1.

$C_{22}H_{28}N_2O_4$; Calculated: C=68.84, H=6.05, N=7.65; Measured: C=68.67, H=6.11, N=7.57.

The polyimide resin was soluble in chloroform, DMSO, DMF, DMAc, NMP, γ-butyrolactone, γ-valerolactone, cyclohexanone, ethyl lactate, m-cresol and pyridine, and had a glass transition temperature of 253° C., a 5% weight decrease temperature of 420° C. and a logarithmic viscosity number of 0.25 (0.5 g/dl, NMP).

The polyimide resin film (thickness: 15 μm) obtained in the same manner as in Example 1 had a light transmittance of 68.8% at 280 nm, 75.4% at 300 nm and 89.9% at 400 nm. The result of adhesivity test was 10.

EXAMPLE 8

In a reactor were placed 9.93 g (40 mmol) of BCD, 60 ml of DMAc, 15 ml of toluene, 4.85 g of crotonic acid and 2.76 g of pyridine. The mixture was heated to 100° C. Thereto was dropwise added 1.012 g (1.2 mmol) of a diaminosiloxane (a product of Sin-Etsu Chemical Co, Ltd.) (hereinafter abbreviated to DASi) (amine equivalent: 421.7). The resulting mixture was subjected to a reaction at 100° C. for 30 minutes and then at 170° C. for 1 hour. The reaction mixture was allowed to cool to 140° C. Then, 5.984 g (38.8 mmol) of NBDA was dropwise added, and a reaction was conducted at 140° C. for 30 minutes and then at 170° C. for 2 hours. The reaction mixture was allowed to cool and poured into a large amount of methanol to give rise to reprecipitation. The precipitate was collected by filtration and dried to obtain 15.2 g of a white powder. This corresponds to a yield of about 90% by weight based on the raw materials for polycondensation.

The polyimide resin obtained was a block copolycondensate polyimide resin and is believed to be composed of 97 mole % of the repeating units consisting of -BCD-NBDA- and 3 mole % of the repeating units consisting of -BCD-DASi- when the units derived from the BCD used was expressed as BCD, the units derived from the DASi used was expressed as DASi, and the units derived form the NBDA used was expressed as NBDA. (Also in the following Examples, the expression of repeating units are made in the same manner).

The siloxane units-containing polyimide resin obtained was soluble in chloroform, DMSO, DMF, DMAc, NMP, γ-butyrolactone, γ-valerolactone, cyclohexanone, dioxane, THF, anisole, 2-methoxyethanol, ethyl lactate, m-cresol and pyridine, and had a glass transition temperature of 258° C., a 5% weight decrease temperature of 420° and a logarithmic viscosity number of 0.13 (0.5 g/dl, NMP).

Figure 3:
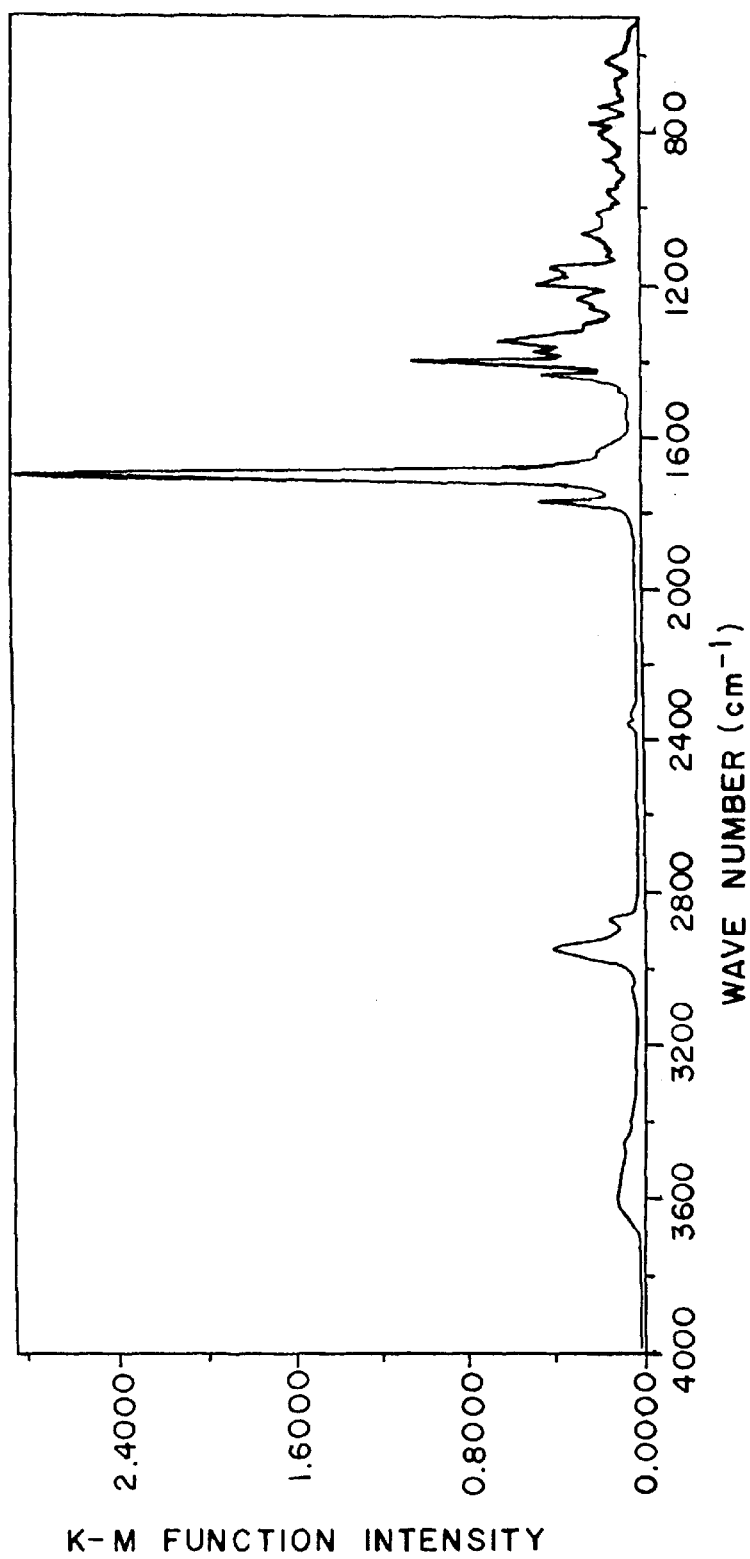
FIG. 3 is an IR spectrum of the soluble polyimide resin of combined diamines type obtained in Example 8.

The polyimide resin film (thickness: 12 μm) obtained in the same manner as in Example 1 had a light transmittance of 66.7% at 280 nm, 82.1% at 300 nm and 87.7% at 400 nm. The result of adhesivity test was 10. The IR spectrum of the polyimide resin is shown in FIG. 3.

2947 cm$^{-1}$: CH stretching; 1770, 1703 cm$^{-1}$: imide C=O stretching.

EXAMPLE 9

In a reactor were placed 4.964 g (20 mmol) of BCD, 40 ml of γ-butyrolactone, 12 ml of toluene and 1.0 g of N-methylmorpholine. The mixture was heated to 100° C. Thereto was dropwise added 1.687 g (2.0 mmol) of DASi (amine equivalent: 421.7). The resulting mixture was subjected to a reaction at 100° C. for 30 minutes and then at 170° C. for 1 hour. The reaction mixture was allowed to cool to 140° C. Then, 2.777 g (18 mmol) of NBDA was dropwise added, and a reaction was conducted at 140° C. for 30 minutes and then at 170° C. for 4 hours. The reaction mixture was allowed to cool and poured into a large amount of methanol to give rise to reprecipitation. The precipitate was collected by filtration and dried to obtain 8.11 g of a white powder. This corresponds to a yield of about 86% by weight based on the raw materials for polycondensation.

The polyimide resin obtained was a block copolycondensate polyimide resin and is believed to be composed of 90 mole % of the repeating units consisting of -BCD-NBDA- and 10 mole % of the repeating units consisting of -BCD-DASi-.

The siloxane units-containing polyimide resin obtained was soluble in chloroform, DMSO, DMF, DMAc, NMP, γ-butyrolactone, γ-valerolactone, cyclohexanone, dioxane, THF, anisole, 2-methoxyethanol, ethyl lactate, m-cresol and pyridine, and had a glass transition temperature of 241° C., a 5% weight decrease temperature of 413° C. and a logarithmic viscosity number of 0.16 (0.5 g/dl, NMP).

The polyimide resin film (thickness: 10 μm) obtained in the same manner as in Example 1 had a light transmittance of 68.0% at 280 nm, 84.2% at 300 nm and 89.6% at 400 nm. The result of adhesivity test was 10.

EXAMPLE 10

In a reactor were placed 6.205 g (25 mmol) of BCD, 25 ml of γ-butyrolactone, 12 ml of toluene and 1.0 g of N-methylmorpholine. The mixture was heated to 120° C. Thereto was dropwise added 1.001 g (5.0 mmol) of 3,4'-diaminodiphenyl ether (hereinafter abbreviated to DDE). The resulting mixture was subjected to a reaction at 100° C. for 30 minutes and then at 170° C. for 1 hour. The reaction mixture was allowed to cool to 140° C. Then, 3.085 g (20 mmol) of NBDA was dropwise added, and a reaction was conducted at 140° C. for 1 hour and then at 170° C. for 3.5 hours. The reaction mixture was allowed to cool and poured into a large amount of methanol to give rise to reprecipitation. The precipitate was collected by filtration and dried to obtain 8.83 g of a polyimide resin as a white powder. This corresponds to a yield of about 86% by weight based on the raw materials for polycondensation.

The polyimide resin obtained was a block copolycondensate polyimide resin and is believed to be composed of 80 mole % of the repeating units consisting of -BCD-NBDA- and 20 mole % of the repeating units consisting of -BCD-DDE-.

The diphenyl ether units-containing polyimide resin obtained was soluble in DMSO, DMF, DMAc, NMP, γ-butyrolactone, γ-valerolactone, m-cresol and pyridine. The polyimide resin gave such a glass transition temperature as to show a clear inflection point at 349° C. and a mild inflection point at 309° C., and had a 5% weight decrease temperature of 432° C. and a logarithmic viscosity number of 0.21 (0.5 g/dl, NMP).

Figure 4:
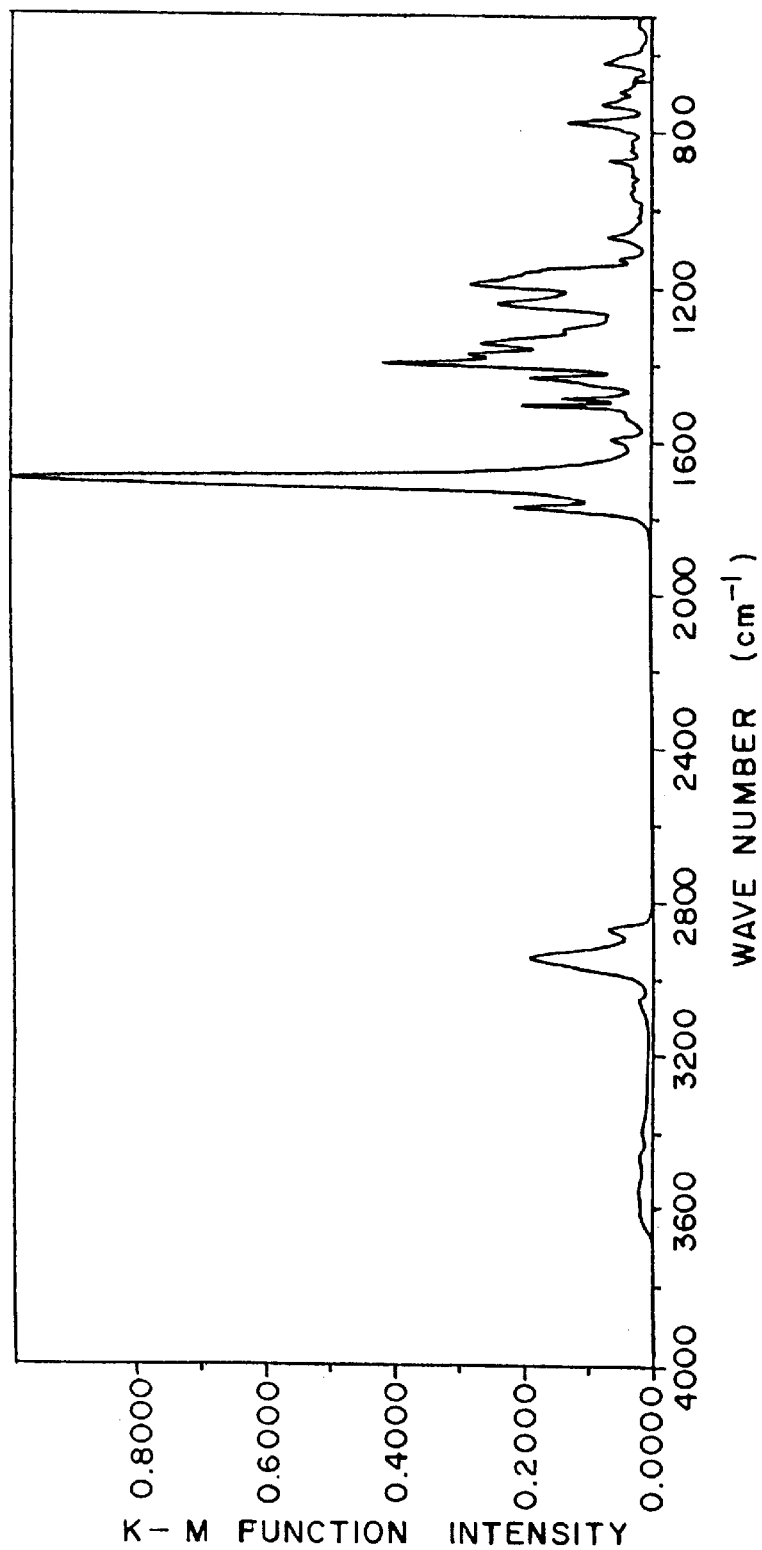
FIG. 4 is an IR spectrum of the soluble polyimide resin of combined diamines type obtained in Example 10.

The polyimide resin film (thickness: 10 μm) obtained in the same manner as in Example 1 had a light transmittance of 4.1% at 280 nm, 20.4% at 300 nm and 78.7% at 400 nm. The result of adhesivity test was 10. The IR spectrum of the polyimide resin is shown in FIG. 4.

2947 cm$^{-1}$: CH stretching; 1772, 1706 cm$^{-1}$: imide C=O stretching.

When the light transmittance exceeds about 70%, the most part of the loss is caused by the reflection on surface and, in the range of film thickness of 10 to 18 μm, change in film thickness gives substantially no effect on light transmittance.

EXAMPLE 11

In a reactor were placed 12.41 g (50 mmol) of BCD, 3.001 g (15 mmol) of DDE, 25 ml of NMP and 10 ml of toluene. The resulting mixture was heated to 80° C. Thereto was dropwise added 5.399 g (35 mmol) of NBDA. A reaction was allowed to take place at 140° C. for 30 minutes and then at 170° C. for 3 hours. The reaction mixture was cooled and poured into a large amount of methanol to give rise to reprecipitation and purification. The precipitate was dried to obtain 18.90 g of a white powder. The yield was 99%.

The polyimide resin obtained was soluble in DMSO, DMF, DMAc, NMP, γ-butyrolactone, γ-valerolactone, m-cresol and pyridine, and had a glass transition temperature of 310° C., a 5% weight decrease temperature of 434° C. and a logarithmic viscosity number of 0.23 dl/g.

The polyimide resin obtained was a random copolycondensate polyimide resin and is believed to be composed of 30 mole % of the repeating units consisting of -BCD-DDE- and 70 mole % of the repeating units consisting of -BCD-NBDA-.

Figure 5:
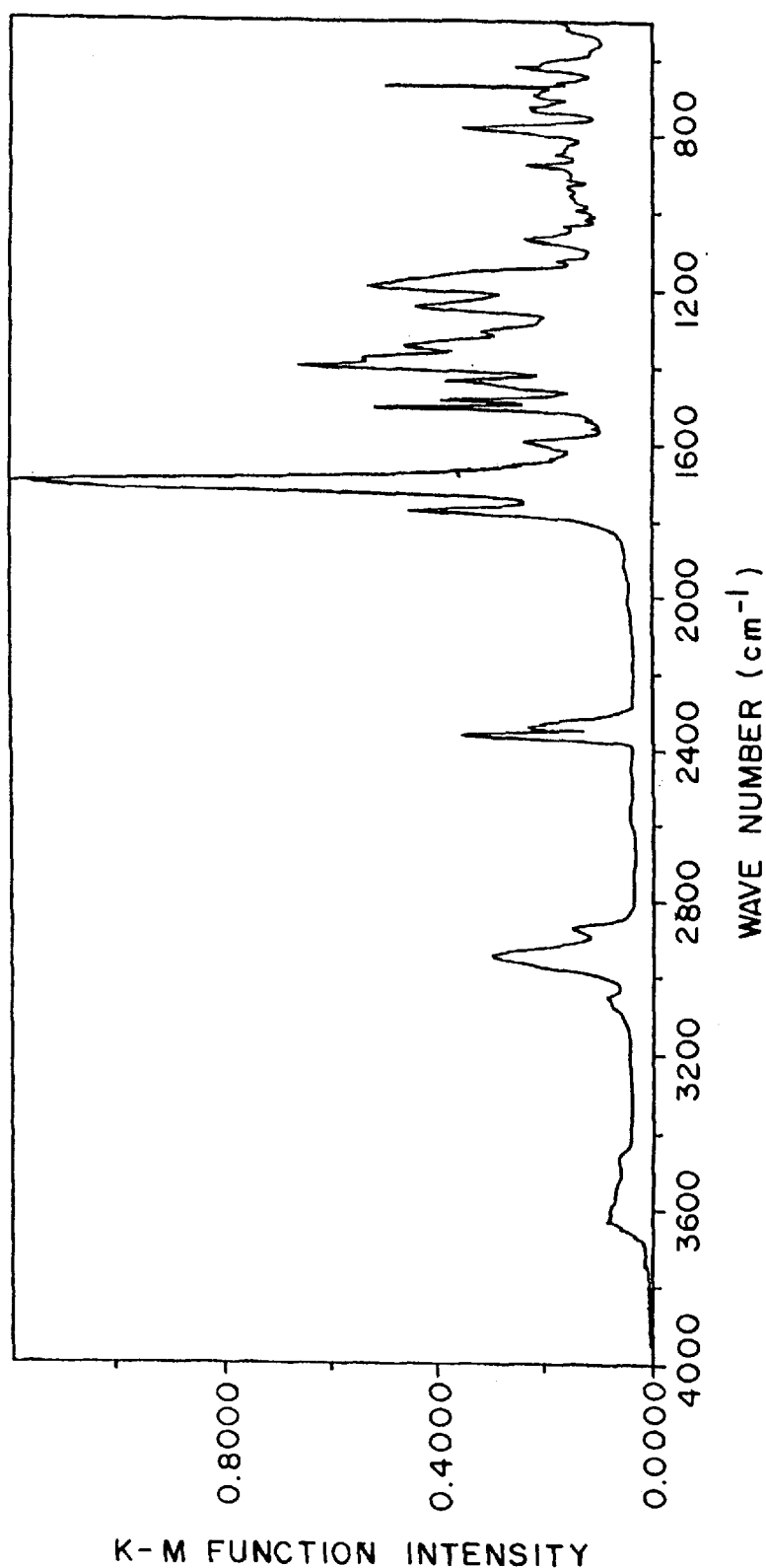
FIG. 5 is an IR spectrum of the soluble polyimide resin of combined diamines type obtained in Example 11.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 13 μm) had a light transmittance of 0.2% at 280 nm, 20.4% at 300 nm, 78.7% at 350 nm and 88.7% at 400 nm. The result of adhesivity test was 10 (no peeling). In flexibility test, the film caused no cracking and showed good flexibility. The IR spectrum of the polyimide resin is shown in FIG. 5.

1772, 1700 cm$^{-1}$: imide C=O stretching.

EXAMPLE 12

In a reactor were placed 6.205 g (25 mmol) of BCD, 15 ml of γ-butyrolactone and 8 ml of toluene. The resulting mixture was heated to 80° C. Thereto was dropwise added 2.530 g (3.0 mmol) of DASi (amine equivalent: 421.7), and a reaction was allowed to take place at 140° C. for 30 minutes and then at 170° C. for 1 hour. The reaction mixture was cooled to 80° C. Thereto was dropwise added 3.394 g (22 mmol) of NBDA, and a reaction was allowed to take place at 140° C. for 30 minutes and then at 170° C. for 3 hours. The reaction mixture was cooled and poured into a large amount of methanol for reprecipitation and purification. The precipitate was dried to obtain 10.89 g of a white powder. The yield was 97%.

The polyimide resin obtained was soluble in chloroform, DMSO, DMF, DMAc, NMP, γ-butyrolactone, γ-valerolactone, cyclohexanone, dioxane, THF, anisole, 2-methoxyethanol, methyl lactate, m-cresol and pyridine, and had a glass transition temperature of 241° C., a 5% weight decrease temperature of 423° C. and a logarithmic viscosity number of 0.30 dl/g. In the DSC curve, there was a mild inflection point at 233° C.

The polyimide resin was a block copolycondensate polyimide resin and is believed to be composed of 12 mole % of the repeating units consisting of -BCD-DASi- and 88 mole % of the repeating units consisting of -BCD-NBDA-.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 12 μm) had a light transmittance of 81.0% at 280 nm, 86.2% at 300 nm, 94.5% at 350 nm and 95.6% at 400 nm. The result of adhesivity test was 10.

Figure 6:
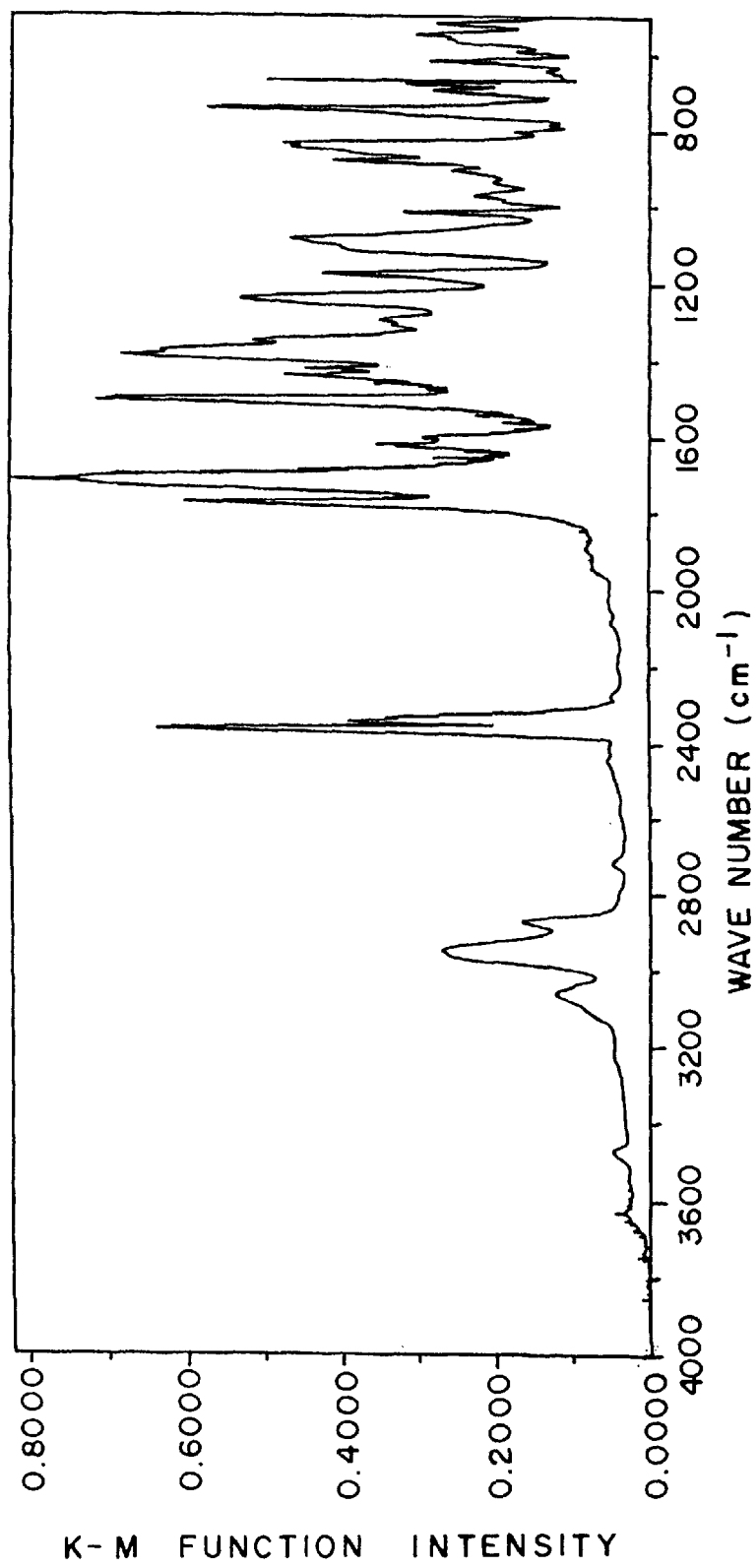
FIG. 6 is an IR spectrum of the soluble polyimide resin of combined diamines type obtained in Example 12.

By using a silicone wafer in place of the mild steel plate, as a test plate, adhesivity test was conducted in the same manner. The result of adhesivity test was 10 (no peeling). In flexibility test, the film caused no cracking and showed good flexibility. The IR spectrum of the polyimide resin is shown in FIG. 6.

1769, 1703 cm$^{-1}$: imide C=O stretching.

EXAMPLE 13

In a reactor were placed 12.41 g (50 mmol) of BCD, 8.650 g (20 mmol) of bis[4-(3-aminophenoxy)phenyl]sulfone (hereinafter abbreviated to BAPS), 1.01 g (10 mmol) of N-methylmorpholine, 33 g of NMP, 3 ml of γ-butyrolactone and 10 ml of toluene. The resulting mixture was subjected to a reaction at 140° C. for 30 minutes and then at 180° C. for 1 hour. The reaction mixture was cooled to 80° C. Thereto was dropwise added 4.628 g (30 mmol) of NBDA, and a reaction was allowed to take place at 140° C. for 30 minutes and then at 180° C. for 2 hours. The reaction mixture was cooled and poured into a large amount of methanol for reprecipitation and purification. The precipitate was dried to obtain 23.50 g of a white powder. The yield was 98%.

The polyimide resin obtained was soluble in DMSO, DMF, DMAc, NMP, γ-butyrolactone, γ-valerolactone, cyclohexanone, m-cresol and pyridine, and had a glass transition temperature of 281° C., a 5% weight decrease temperature of 441° C. and a logarithmic viscosity number of 0.35 dl/g.

The polyimide resin was a block copolycondensate polyimide resin and is believed to be composed of 40 mole % of the repeating units consisting of -BCD-BAPS- and 60 mole % of the repeating units consisting of -BCD-NBDA-.

Figure 7:
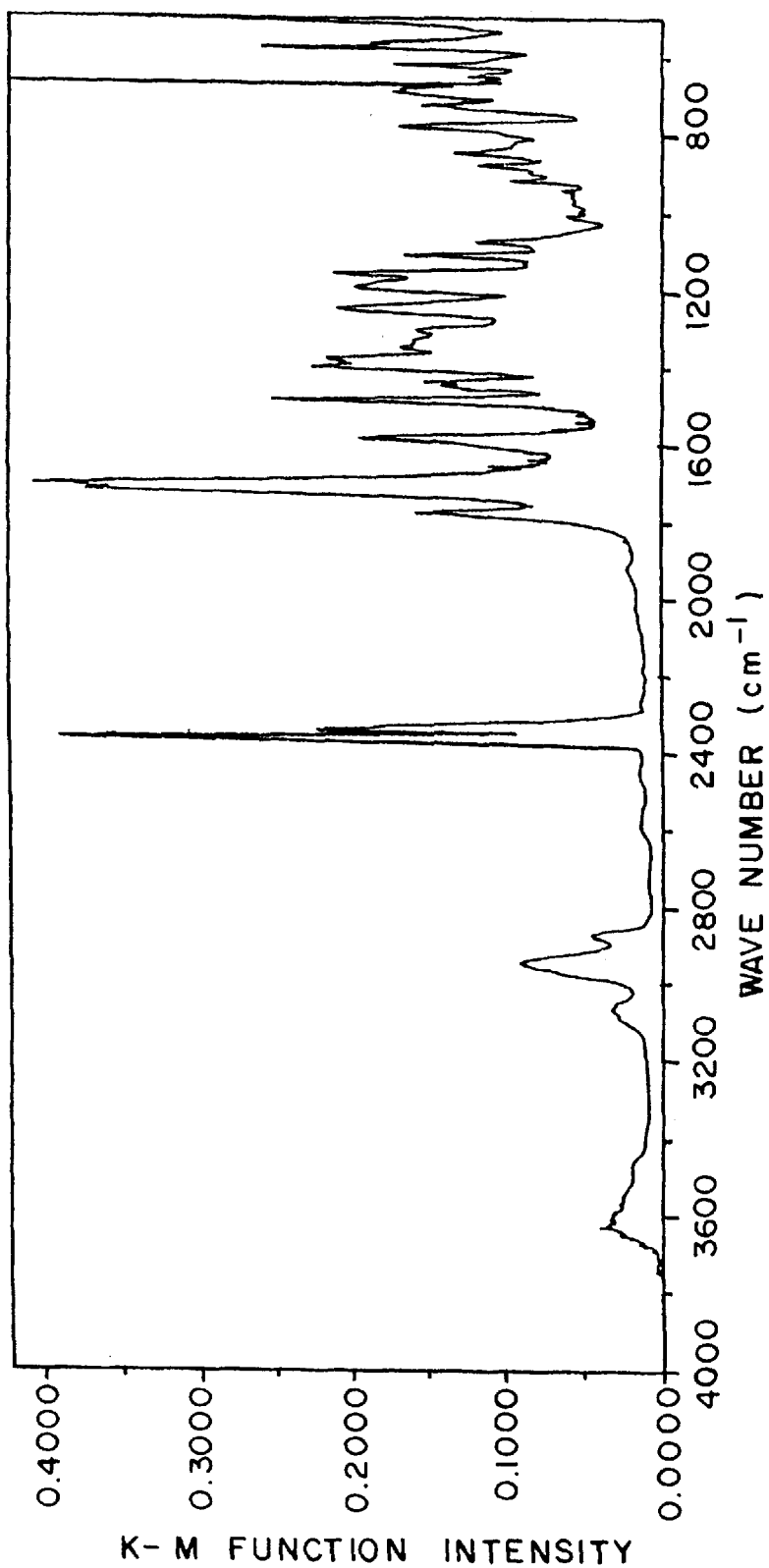
FIG. 7 is an IR spectrum of the soluble polyimide resin of combined diamines type obtained in Example 13.

The polyimide resin was made into a γ-butyrolactone solution and coated on a glass plate by the use of an applicator. The coated glass plate was treated at atmospheric pressure at 200° for 30 minutes and then immersed in water to give rise to peeling of film, whereby a polyimide resin film was obtained. The polyimide resin film (thickness: 15 μm) had a light transmittance of 0% at 280 nm, 38.7% at 300 nm, 88.0% at 350 nm and 94.2% at 400 nm. The result of adhesivity test was 10 (no peeling). In flexibility test, the film caused no cracking and showed good flexibility. The IR spectrum of the polyimide resin is shown in FIG. 7.

1772, 1700 cm$^{-1}$: imide C=O stretching.

EXAMPLE 14

In a reactor were placed 12.41 g (50 mmol) of BCD, 3.343 g (10 mmol) of 2,2-bis(4-aminophenyl)-1,1,1,3,3,3-hexafluoropropane (hereinafter abbreviated to 6FPP), 1.01 g (10 mmol) of N-methylmorpholine, 25 ml of NMP, 3 ml of γ-butyrolactone and 10 ml of toluene. The resulting mixture was subjected to a reaction at 140° C. for 30 minutes and then at 180° C. for 1 hour. The reaction mixture was cooled to 80° C. Thereto was dropwise added 6.170 g (40 mmol) of NBDA, and a reaction was allowed to take place at 140° C. for 30 minutes and then at 180° C. for 2 hours. The reaction mixture was cooled and poured into a large amount of methanol for reprecipitation and purification. The precipitate was dried to obtain 19.30 g of a white powder. The yield was 96%.

The polyimide resin obtained was soluble in chloroform, DMSO, DMF, DMAc, NMP, γ-butyrolactone, γ-valerolactone, dioxane, THF, MMP, ethyl lactate, m-cresol and pyridine, and had a glass transition temperature of 308° C., a 5% weight decrease temperature of 428° C. and a logarithmic viscosity number of 0.17 dl/g.

The polyimide resin was a block copolycondensate polyimide resin and is believed to be composed of 20 mole % of the repeating units consisting of -BCD-6FPP- and 80 mole % of the repeating units consisting of -BCD-NBDA-.

Figure 8:
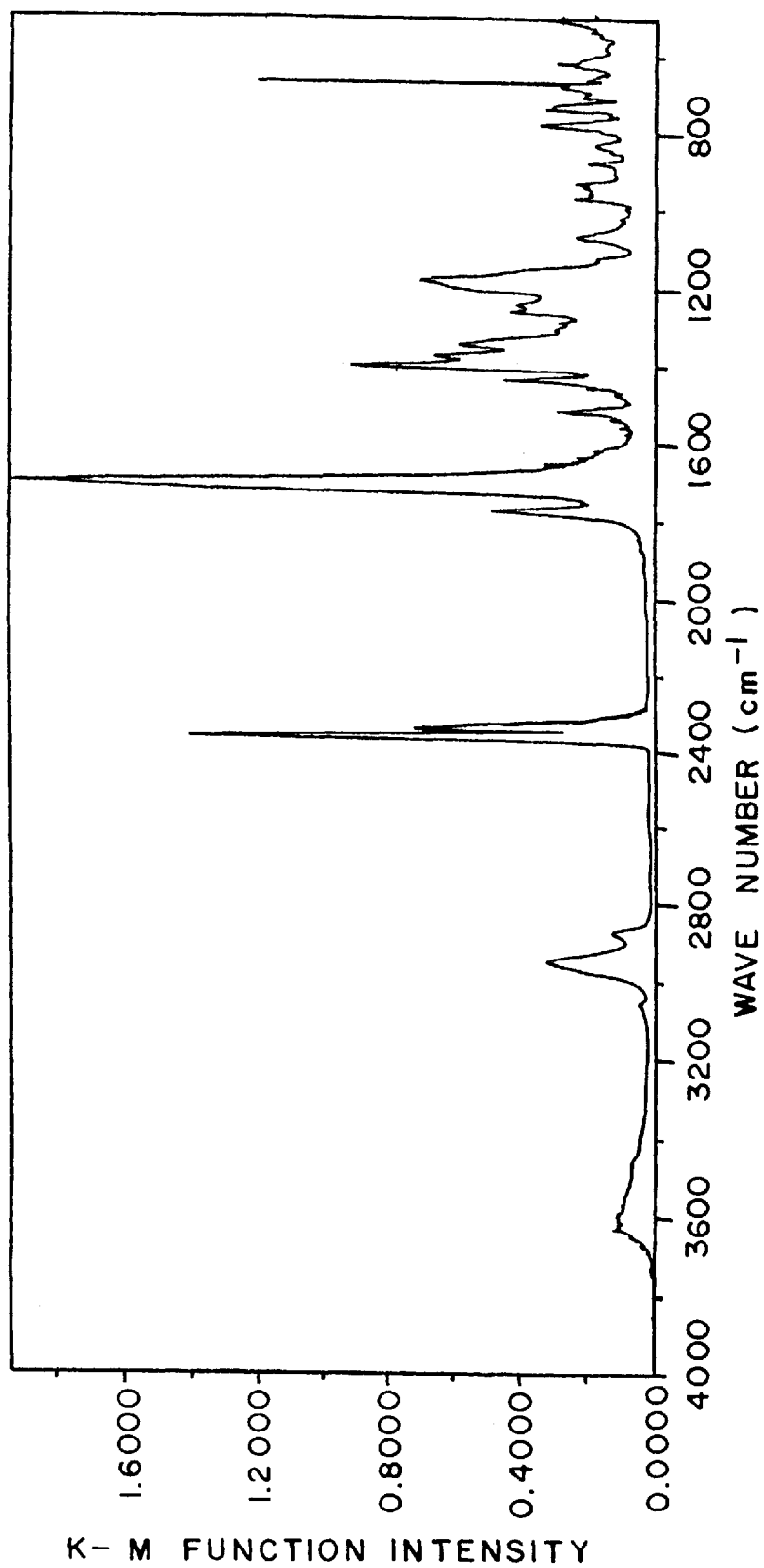
FIG. 8 is an IR spectrum of the soluble polyimide resin of combined diamines type obtained in Example 14.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 11 μm) had a light transmittance of 0.2% at 280 nm, 35.1% at 300 nm, 89.4% at 350 nm and 94.6% at 400 nm. The result of adhesivity test was 10 (no peeling). In flexibility test, the film caused no cracking and showed good flexibility. The IR spectrum of the polyimide resin is shown in FIG. 8.

1772, 1700 cm$^{-1}$: imide C=O stretching.

EXAMPLE 15

In a reactor were placed 12.41 g (50 mmol) of BCD, 8.20 g (20 mmol) of 2,2-bis[4-aminophenoxy)phenyl]propane (hereinafter abbreviated to BAPP), 1.01 g (10 mmol) of N-methylmorpholine, 25 ml of NMP and 10 ml of toluene. The resulting mixture was heated to 80° C. Thereto was dropwise added 4.628 g (30 mmol) of NBDA, and a reaction was allowed to take place at 140° C. for 30 minutes and then at 170° C. for 2 hours. The reaction mixture was cooled and poured into a large amount of methanol for reprecipitation and purification. The precipitate was dried to obtain 23.40 g of a white powder. The yield was 100%.

The polyimide resin obtained was soluble in chloroform, DMSO, DMF, DMAc, NMP, γ-butyrolactone, γ-valerolactone, cyclohexanone, dioxane, m-cresol and pyridine, and had a glass transition temperature of 298° C., a 5% weight decrease temperature of 430° C. and a logarithmic viscosity number of 0.45 dl/g.

The polyimide resin was a random copolycondensate polyimide resin and is believed to be composed of 40 mole % of the repeating units consisting of -BCD-BAPP- and 60 mole % of the repeating units consisting of -BCD-NBDA-.

Figure 9:
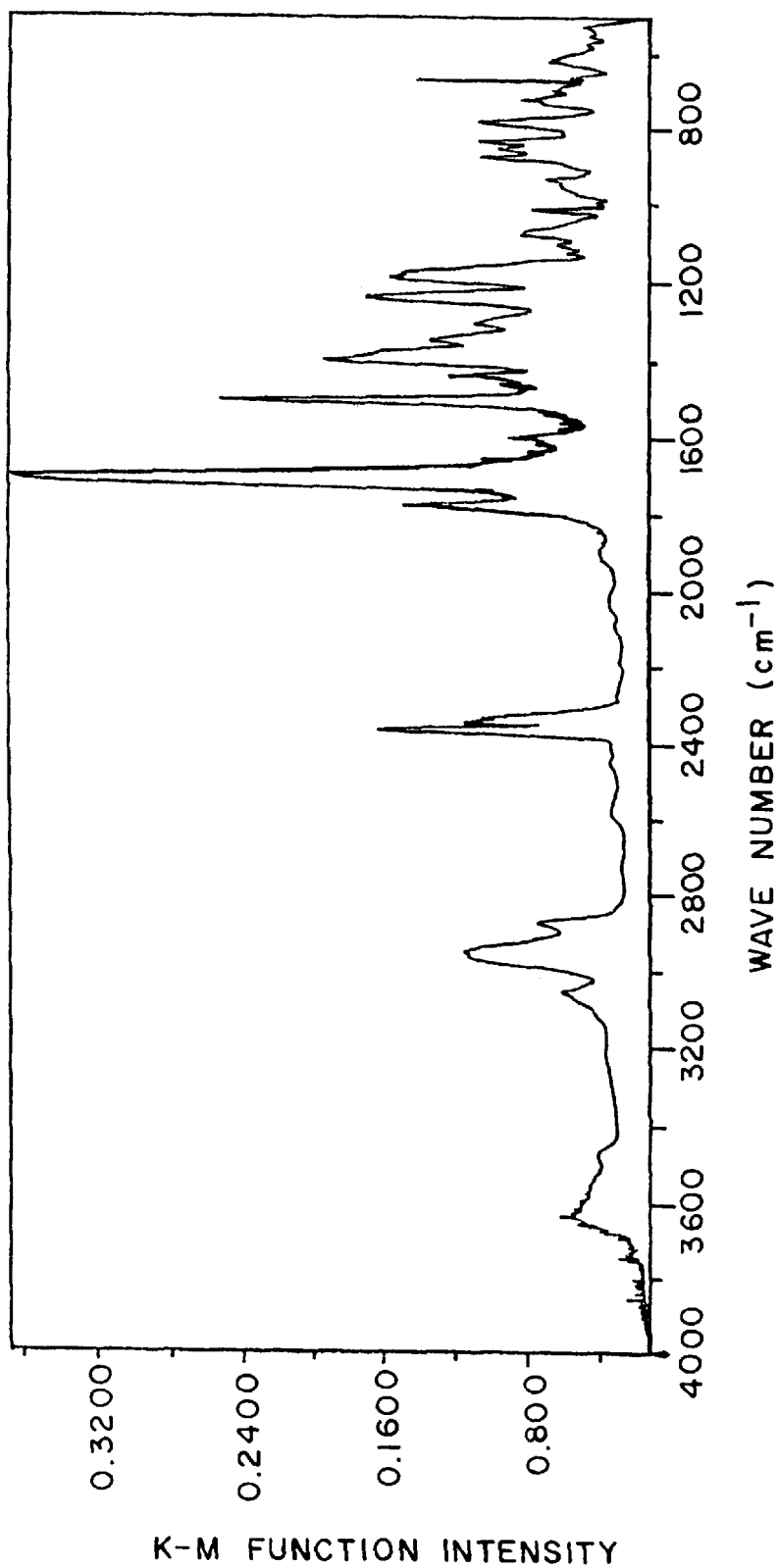
FIG. 9 is an IR spectrum of the soluble polyimide resin of combined diamines type obtained in Example 15.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 13 μm) had a light transmittance of 0.2% at 280 nm, 74.8% at 300 nm, 94.1% at 350 nm and 94.9% at 400 nm. The result of adhesivity test was 10 (no peeling). In flexibility test, the film caused no cracking and showed good flexibility. The IR spectrum of the polyimide resin is shown in FIG. 9.

1772, 1700 cm$^{-1}$: imide C=O stretching.

EXAMPLE 16

In a reactor were placed 6.205 g (25 mmol) of BCD, 1.001 g (5 mmol) of DDE, 1.01 g (10 mmol) of N-methylmorpholine, 5 ml of NMP, 10 ml of γ-butyrolactone and 8 ml of toluene. The resulting mixture was subjected to a reaction at 140° C. for 30 minutes and then at 180° C. for 1 hour. The reaction mixture was cooled to 80° C. Thereto was dropwise added 2.250 g (2.5 mmol) of DASi (amine equivalent: 450.0), and a reaction was allowed to take place at 140° C. for 30 minutes and then at 170° C. for 3 hours. The reaction mixture was cooled to 80° C. Thereto was dropwise added 2.699 g (17.5 mmol) of NBDA, and a reaction was allowed to take place at 140° C. for 30 minutes and then at 170° C. for 3 hours. The reaction mixture was cooled and poured into a large amount of methanol for reprecipitation and purification. The precipitate was dried to obtain 10.84 g of a white powder. The yield was 96%.

The polyimide resin obtained was soluble in chloroform, DMSO, DMF, DMAc, NMP, γ-butyrolactone, γ-valerolactone, cyclohexanone, dioxane, MMP, ethyl lactate, m-cresol and pyridine, and had a 5% weight decrease temperature of 430° C. and a logarithmic viscosity number of 0.16 dl/g. With respect to the glass transition temperature, there was a clear inflection point at 256° C. and a mild inflection point at 235° C.

The polyimide resin was a block copolycondensate polyimide resin containing three kinds of diamines as the diamine component and is believed to be composed of 20 mole % of the repeating units consisting of -BCD-DDE-, 10 mole % of the repeating units consisting of -BCD-DASi- and 70 mole % of the repeating units consisting of -BCD-NBDA-.

Figure 10:
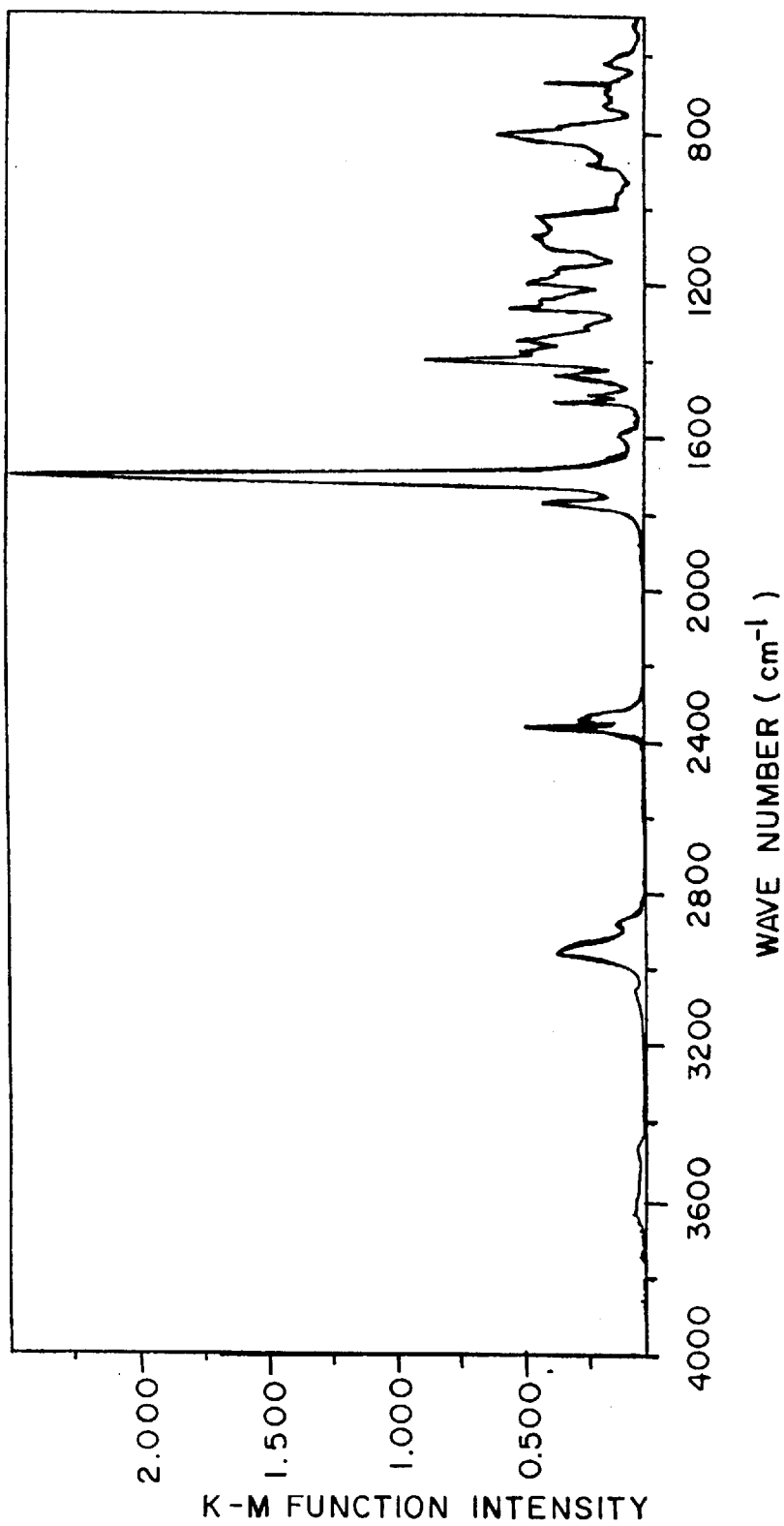
FIG. 10 is an IR spectrum of the soluble polyimide resin of combined diamines type obtained in Example 16.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 13 μm) had a light transmittance of 14.8% at 280 nm, 38.3% at 300 nm, 89.2% at 350 nm and 93.9% at 400 nm. The result of adhesivity test was 10. By using a silicone wafer in place of the mild steel plate, as a test plate, adhesivity test was conducted in the same manner. The result of adhesivity test was 10 (no peeling). In flexibility test, the film caused no cracking and showed good flexibility. The IR spectrum of the polyimide resin is shown in FIG. 10.

1772, 1706 cm$^{-1}$: imide C=O stretching.

EXAMPLE 17

In a reactor were placed 8.687 g (35 mmol) of BCD, 4.413 g (15 mmol) of 3,4,3',4'-biphenyltetracarboxylic acid dianhydride (hereinafter abbreviated to BPDA), 8.20 g (20 mmol) of BAPP, 10 ml of NMP, 15 ml of γ-butyrolactone and 15 ml of toluene. The resulting mixture was subjected to a reaction at 140° C. for 30 minutes and then at 180° C. for 1 hour. The reaction mixture was cooled to 80° C. Thereto was dropwise added 4.628 g (30 mmol) of NBDA, and a reaction was allowed to take place at 140° C. for 1 hour and then at 170° C. for 2 hours. The reaction mixture was cooled and poured into a large amount of methanol for reprecipitation and purification. The precipitate was dried to obtain 22.80 g of a white powder. The yield was 95%.

The polyimide resin obtained was soluble in DMSO, DMF, DMAc, NMP, γ-butyrolactone, γ-valerolactone and dioxane, and had a glass transition temperature of 253° C., a 5% weight decrease temperature of 448° C. and a logarithmic viscosity number of 0.53 dl/g.

The polyimide resin was a block copolycondensate polyimide resin wherein the two kinds of acid components were arranged in random and the two kinds of diamine components were arranged in block, and is believed to be composed of 28 mole % of the repeating units consisting of -BCD-BAPP-, 12 mole % of the repeating units consisting of -BPDA-BAPP-, 42 mole % of the repeating units consisting of -BCD-NBDA- and 18 mole % of the repeating units consisting of -BPDA-NBDA-.

Figure 11:
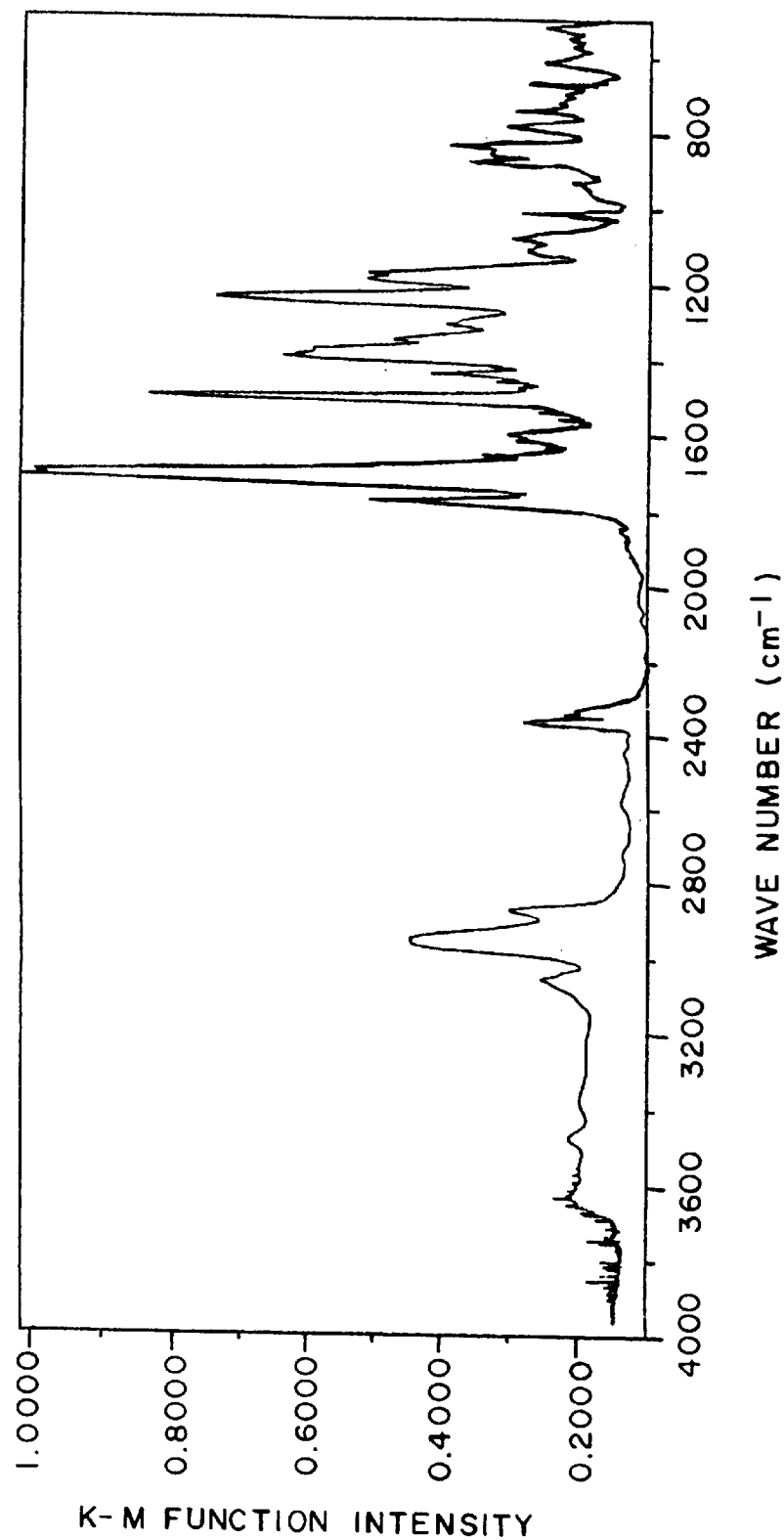
FIG. 11 is an IR spectrum of the soluble polyimide resin of combined diamines type obtained in Example 17.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 13 μm) had a light transmittance of 0.1% at 280 nm, 0.1% at 300 nm, 0.4% at 350 nm and 65.5% at 400 nm. The result of adhesivity test was 10 (no peeling). In flexibility test, the film caused no cracking and showed good flexibility. The IR spectrum of the polyimide resin is shown in FIG. 11.

1772, 1717 cm$^{-1}$: imide C=O stretching.

EXAMPLE 18

In a reactor were placed 8.687 g (35 mmol) of BCD, 4.413 g (15 mmol) of BPDA, 3.004 g (15 mmol) of DDE, 20 ml of NMP, 5 ml of γ-butyrolactone and 15 ml of toluene. The resulting mixture was heated to 80° C. Thereto was dropwise added 5.399 g (35 mmol) of NBDA, and a reaction was allowed to take place at 140° C. for 1 hour and then at 170° C. for 3 hours. The reaction mixture was cooled and poured into a large amount of methanol for reprecipitation and purification. The precipitate was dried to obtain 19.21 g of a white powder. The yield was 98%.

The polyimide resin obtained was soluble in chloroform, DMSO, DMF, DMAc, NMP and γ-butyrolactone, and had a glass transition temperature of 285° C., a 5% weight decrease temperature of 440° C. and a logarithmic viscosity number of 0.42 dl/g.

The polyimide resin was a random copolycondensate polyimide resin wherein the two kinds of acid components and the two kinds of diamine components were all arranged in random, and is believed to be composed of 21 mole % of the repeating units consisting of -BCD-DDE-, 9 mole % of the repeating units consisting of -BPDA-DDE-, 49 mole % of the repeating units consisting of -BCD-NBDA- and 21 mole % of the repeating units consisting of -BPDA-NBDA-.

Figure 12:
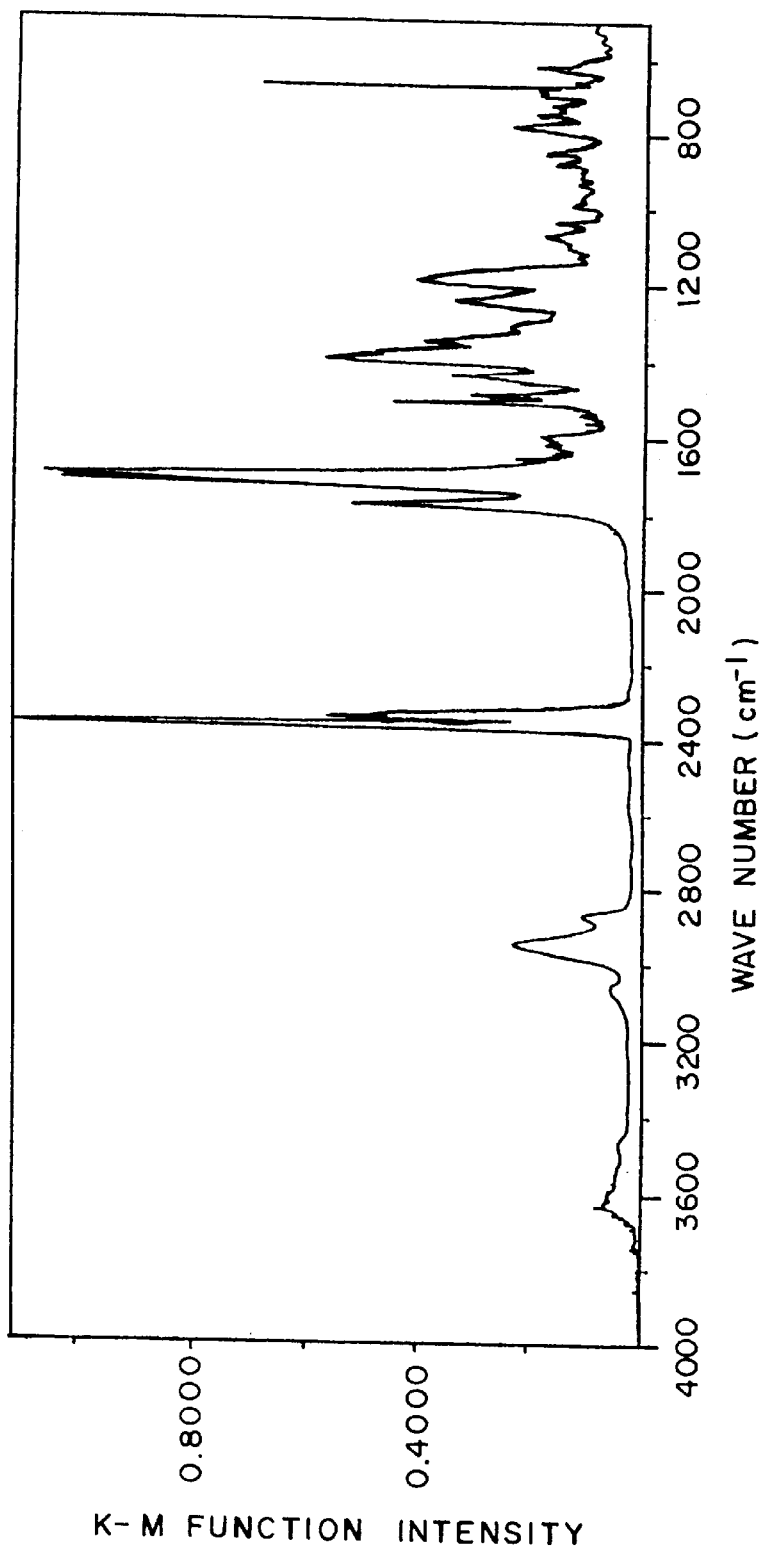
FIG. 12 is an IR spectrum of the soluble polyimide resin of combined diamines type obtained in Example 18.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 12 μm) had a light transmittance of 0.1% at 280 nm, 0.2% at 300 nm, 0.7% at 350 nm and 92.9% at 400 nm. The result of adhesivity test was 10 (no peeling). In flexibility test, the film caused no cracking and showed good flexibility. The IR spectrum of the polyimide resin is shown in FIG. 12.

1772, 1705 cm$^{-1}$: imide C=O stretching.

EXAMPLE 19

In a reactor were placed 12.41 g (50 mmol) of BCD, 6.158 g (15 mmol) of BAPP, 1.01 g (10 mmol) of N-methylmorpholine, 20 ml of NMP, 3.0 ml of γ-butyrolactone and 10 ml of toluene. The resulting mixture was subjected to a reaction at 140° C. for 30 minutes and then at 180° C. for 1 hour. The reaction mixture was cooled to 80° C. Thereto was dropwise added 4.500 g (5.0 mmol) of DASi (amine equivalent: 450.0), and a reaction was allowed to take place at 140° C. for 30 minutes and then at 170° C. for 3 hours. The reaction mixture was cooled to 80°

C. Thereto was dropwise added 4.628 g (30 mmol) of NBDA, and a reaction was allowed to take place at 140° C. for 30 minutes and then at 170° C. for 3 hours. The reaction mixture was cooled and poured into a large amount of methanol for reprecipitation and purification. The precipitate was dried to obtain 25.70 g of a white powder. The yield was 93%.

The polyimide resin obtained was soluble in chloroform, DMSO, DMF, DMAc, NMP, γ-butyrolactone, γ-valerolactone, cyclohexanone, dioxane, THF and ethyl lactate, and had a glass transition temperature of 221° C., a 5% weight decrease temperature of 432° C. and a logarithmic viscosity number of 0.31 dl/g. In the DSC curve, there was a mild inflection point at 240° C.

The polyimide resin was a terblock copolycondensate polyimide resin wherein the three kinds of diamine components used were each arranged in block, and is believed to be composed of 30 mole % of the repeating units consisting of -BCD-BAPP-, 10 mole % of the repeating units consisting of -BCD-DASi- and 60 mole % of the repeating units consisting of -BCD-NBDA-.

Figure 13:
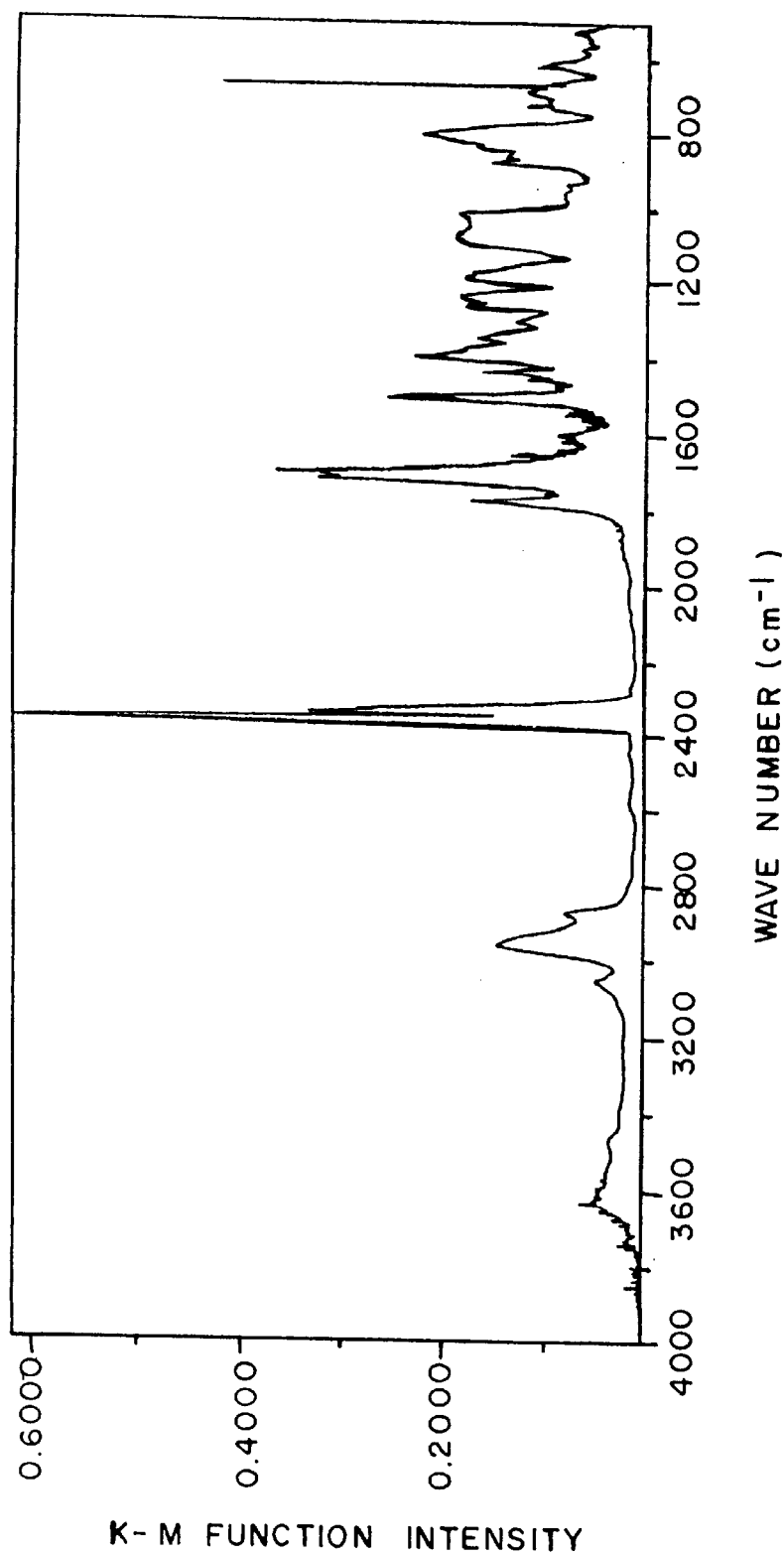
FIG. 13 is an IR spectrum of the soluble polyimide resin of combined diamines type obtained in Example 19.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 14 μm) had a light transmittance of 0.3% at 280 nm, 75.8% at 300 nm, 94.0% at 350 nm and 95.0% at 400 nm. The result of adhesivity test was 10. By using a silicone wafer in place of the mild steel plate, as a test plate, adhesivity test was conducted in the same manner. The result of adhesivity test was 10 (no peeling). In flexibility test, the film caused no cracking and showed good flexibility. The IR spectrum of the polyimide resin is shown in FIG. 13.

1772, 1705 cm$^{-1}$: imide C=O stretching.

EXAMPLE 20

In a reactor were placed 9.928 g (40 mmol) of BCD, 2.181 g (10 mmol) of pyromellitic acid dianhydride (hereinafter abbreviated to PMDA), 25 ml of NMP and 10 ml of toluene. The resulting mixture was heated to 80° C. Thereto was dropwise added 2.250 g (2.5 mmol) of DASi (amine equivalent: 450.0), and a reaction was allowed to take place at 140° C. for 30 minutes and then at 170° C. for 3 hours. The reaction mixture was cooled to 80° C. Thereto was dropwise added 7.327 g (47.5 mmol) of NBDA, and a reaction was allowed to take place at 140° C. for 30 minutes and then at 170° C. for 3 hours. The reaction mixture was cooled and poured into a large amount of methanol for reprecipitation and purification. The precipitate was dried to obtain 19.20 g of a white powder. The yield was 97%.

The polyimide resin obtained was soluble in chloroform, DMSO, DMF, DMAc, NMP, γ-butyrolactone, γ-valerolactone, cyclohexanone, dioxane, ethyl lactate, m-cresol and pyridine, and had a glass transition temperature of 255° C., a 5% weight decrease temperature of 430° C. and a logarithmic viscosity number of 0.24 dl/g. In the DSC curve, there was a mild inflection point at 237° C.

The polyimide resin was a copolycondensate polyimide resin wherein the two kinds of acid components were arranged in random and the two kinds of diamine components were arranged in block, and is believed to be composed of 4 mole % of the repeating units consisting of -BCD-DASi-, 1 mole % of the repeating units consisting of -PMDA-DASi-, 76 mole % of the repeating units consisting of -BCD-NBDA- and 19 mole % of the repeating units consisting of -PMDA-NBDA-.

Figure 14:
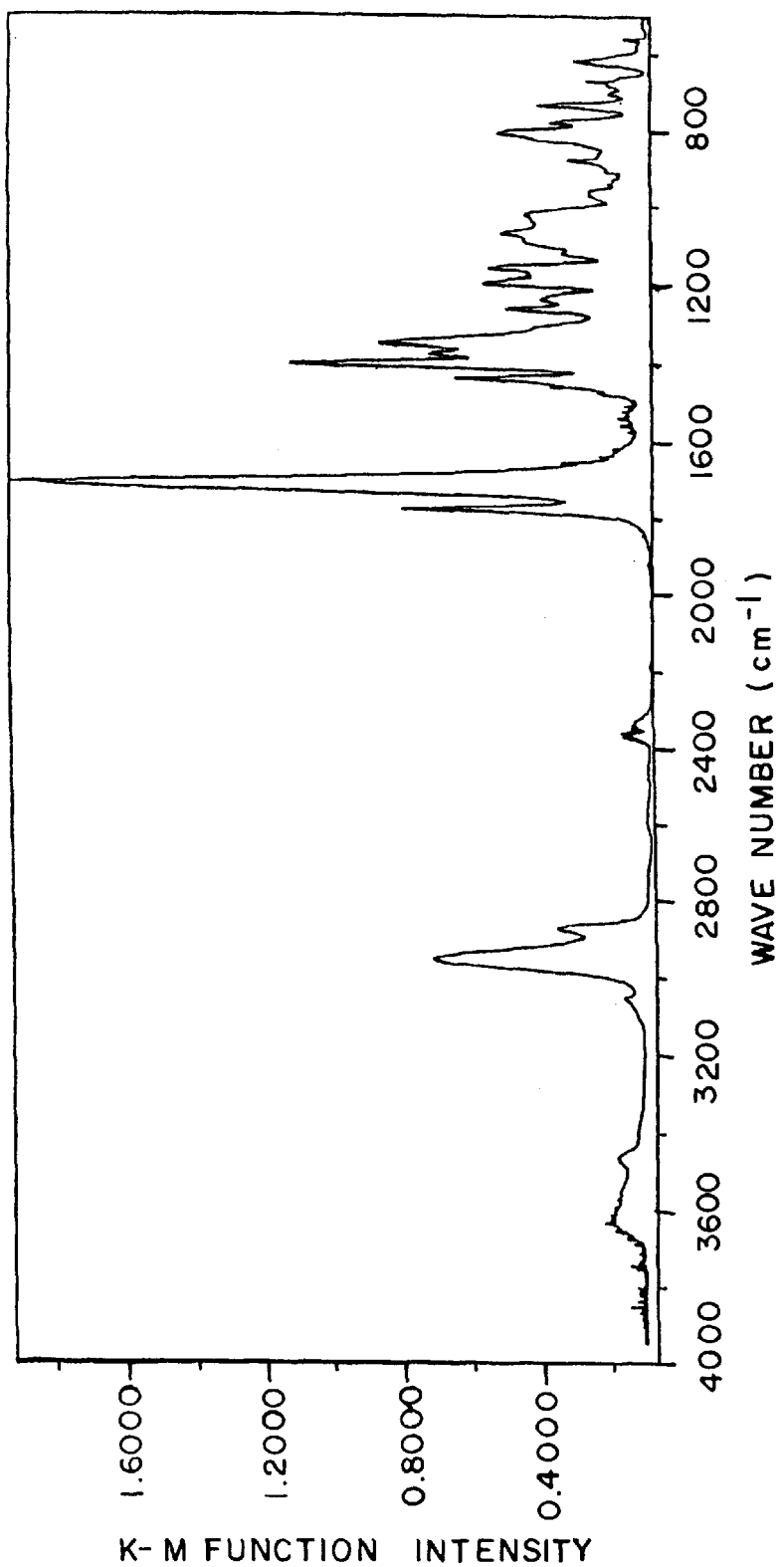
FIG. 14 is an IR spectrum of the soluble polyimide resin of combined diamines type obtained in Example 20.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 13 μm) had a light transmittance of 14.0% at 280 nm, 10.8% at 300 nm, 65.0% at 350 nm and 94.7% at 400 nm. The result of adhesivity test was 10. By using a silicone wafer in place of the mild steel plate, as a test plate, adhesivity test was conducted in the same manner. The result of adhesivity test was 10 (no peeling). In flexibility test, the film caused no cracking and showed good flexibility. The IR spectrum of the polyimide resin is shown in FIG. 14.

1772, 1700 cm$^{-1}$: imide C=O stretching.

EXAMPLE 21

In a reactor were placed 10.55 g (42.5 mmol) of BCD, 1.638 g (7.5 mmol) of PMDA, 4.10 g (10 mmol) of BAPP, 25 ml of NMP and 10 ml of toluene. The resulting mixture was subjected to a reaction at 140° C. for 30 minutes and then at 170° C. for 1 hour. The reaction mixture was cooled to 80° C. Thereto was dropwise added 2.250 g (2.5 mmol) of DASi (amine equivalent: 450.0) and a reaction was allowed to take place at 140° C. for 1 hour and then at 170° C. for 3 hours. The reaction mixture was cooled to 80° C. Thereto was dropwise added 5.786 g (37.5 mmol) of NBDA, and a reaction was allowed to take place at 140° C. for 30 minutes and then at 170° C. for 3 hours. The reaction mixture was cooled and poured into a large amount of methanol for reprecipitation and purification. The precipitate was dried to obtain 22.47 g of a white powder. The yield was 99%.

The polyimide resin obtained was soluble in chloroform, DMSO, DMF, DMAc, NMP, γ-butyrolactone, γ-valerolactone, cyclohexanone, dioxane, ethyl lactate, m-cresol and pyridine, and had a glass transition temperature of 267° C., a 5% weight decrease temperature of 440° C. and a logarithmic viscosity number of 0.38 dl/g.

The polyimide resin was a copolycondensate polyimide resin wherein the acid components were arranged in random and the three kinds of diamine components were each arranged in block, and is believed to be composed of 17 mole % of the repeating units consisting of -BCD-BAPP-, 3 mole % of the repeating units consisting of -PMDA-BAPP-, 4.25 mole % of the repeating units consisting of -BCD-DASi-, 0.75 mole % of the repeating units consisting of -PMDA-DASi-, 63.75 mole % of the repeating units consisting of -BCD-NBDA- and 11.25 mole % of the repeating units consisting of -PMDA-NBDA-.

Figure 15:
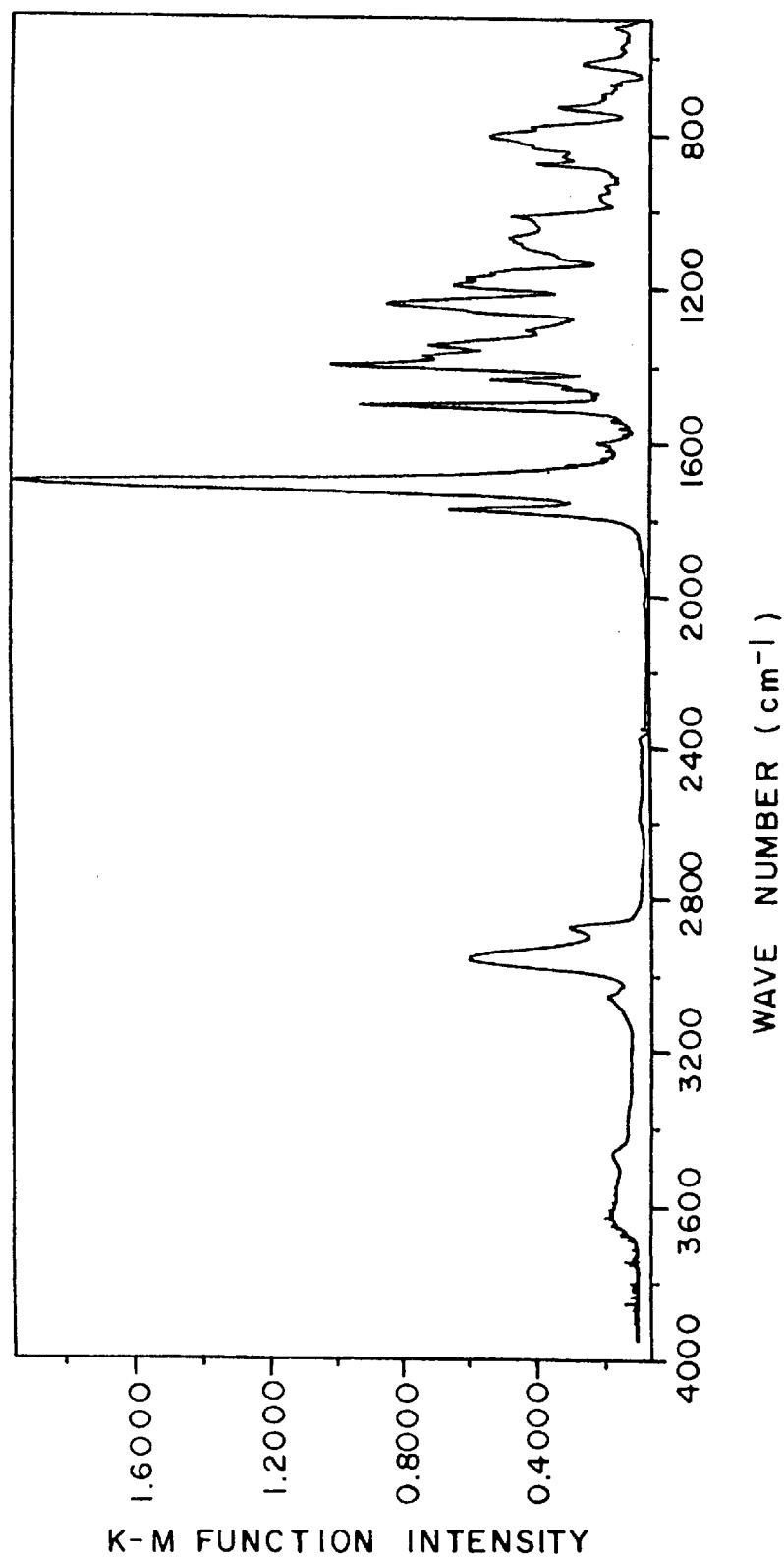
FIG. 15 is an IR spectrum of the soluble polyimide resin of combined diamines type obtained in Example 21.

The polyimide resin was made into a γ-butyrolactone solution and coated on a glass plate by the use of an applicator. The coated glass plate was treated at atmospheric pressure at 200° C. for 30 minutes and then immersed in water to give rise to peeling of film, whereby a polyimide resin film was obtained. The polyimide resin film (thickness: 12 μm) had a light transmittance of 0.2% at 280 nm, 2.3% at 300 nm, 64.0% at 350 nm and 85.8% at 400 nm. The result of adhesivity test was 10. By using a silicone wafer in place of the mild steel plate, as a test plate, adhesivity test was conducted in the same manner. The result of adhesivity test was 10 (no peeling). In flexibility test, the film caused no cracking and showed good flexibility. The IR spectrum of the polyimide resin is shown in FIG. 15.

1772, 1705 cm$^{-1}$: imide C=O stretching.

INDUSTRIAL APPLICABILITY

The soluble polyimide resin of the present invention has excellent solubility in solvents and excellent transparency while retaining the heat resistance inherently possessed by polyimide resins; therefore, it is useful particularly in electronics and optronics fields and moreover has good processability.

The present polyimide resin, when made into a film, has high flexibility. Further, by appropriately combining the raw materials, for example, by using a diaminopolysiloxane as a raw material, a polyimide resin soluble even in low-boiling solvents can be obtained, making possible low-temperature film making.

Furthermore, the present polyimide resin, when containing a diaminosiloxane as one element of repeating units, has excellent adhesivity even to silicon wafer.

What is claimed is:

1. A soluble polyimide resin containing, as essential diamine units, the units represented by the following formula [1]:

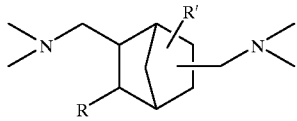

[1]

(wherein R and R' are each independently selected from a hydrogen atom, a methyl group and an ethyl group; and R' does not bond to the carbon atom to which an aminomethyl group bonds) and having:
 a light transmittance of 60% or more in a range of wavelength larger than 400 nm in an ultraviolet-visible light spectrum measured for a film of 10-$\mu$m thickness, and
 a logarithmic viscosity number of 0.1 to 1.5.

2. A soluble polyimide resin containing the repeating units represented by the following formula [7]:

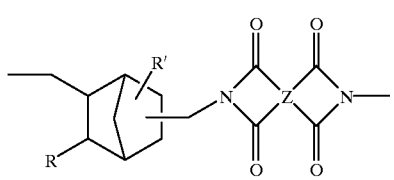

[7]

(wherein R and R' are each independently selected from a hydrogen atom, a methyl group and an ethyl group; R' does not bond to the carbon atom to which an aminomethyl group bonds; Z is a tetravalent organic group having four or more carbon atoms; and there is no case that a plurality of —CO— groups bond to one of the carbon atoms of Z) and having:
 a light transmittance of 60% or more in a range of wavelength larger than 400 nm in an ultraviolet-visible light spectrum measured for a film of 10-$\mu$m thickness, and
 a logarithmic viscosity number of 0.1 to 1.5.

3. A soluble polyimide resin of combined diamines containing the repeating units represented by the following formula [7]:

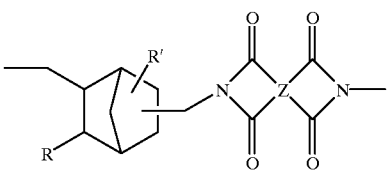

[7]

(wherein R and R' are each independently selected from a hydrogen atom, a methyl group and an ethyl group; R' does not bond to the carbon atom to which an aminomethyl group bonds; Z is a tetravalent organic group having four or more carbon atoms; and there is no case that a plurality of —CO— groups bond to one of the carbon atoms of Z) and the repeating units represented by the following formula [8]:

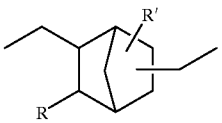

[8]

[wherein Y is at least one group selected from the group consisting of bivalent aliphatic groups, bivalent alicyclic groups other than bivalent groups represented by the following formula [4]:

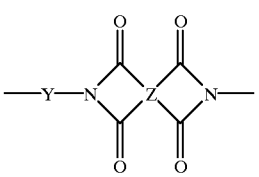

[4]

(wherein R and R' are each independently selected from a hydrogen atom, a methyl group and an ethyl group; and R' does not bond to the carbon atom to which an aminomethyl group bonds), bivalent aromatic groups and bivalent siloxane groups; and Z has the same definition as given above] and having:
 a light transmittance of 60% or more in a range of wavelength larger than 400 nm in an ultraviolet-visible light spectrum measured for a film of 10-$\mu$m thickness, and
 a logarithmic viscosity number of 0.1 to 1.5.

4. A soluble polyimide resin according to claim 1, which contains an aliphatic tetracarboxylic acid dianhydride or/and an alicyclic tetracarboxylic acid dianhydride as tetracarboxylic acid dianhydride units.

5. A soluble polyimide resin according to claim 2, wherein Z is a group selected from the group consisting of aliphatic groups, alicyclic groups and aromatic groups.

6. A soluble polyimide resin according to claim 2, wherein Z is an aliphatic group or/and an alicyclic group.

7. A soluble polyimide resin of combined diamines according to claim 3, which contains at least one alicyclic tetracarboxylic acid dianhydride as tetracarboxylic acid dianhydride units.

8. A soluble polyimide resin of combined diamines according to claim 7, which further contains an aromatic tetracarboxylic acid dianhydride as tetracarboxylic acid dianhydride units.

9. A soluble polyimide resin of combined diamines according to claim 3, wherein Z is at least one alicyclic group.

10. A soluble polyimide resin of combined diamines according to claim 9, wherein Z is at least one alicyclic group and an aromatic group.

11. A soluble polyimide resin of combined diamines according to claim 3, wherein the proportion of the repeating units of the formula [7] is 30 to 97 mole % of the total repeating units.

12. A soluble polyimide resin of combined diamines according to claim 3, wherein in the formula [8], Y is derived from the raw material diamine represented by the following formula [3]:

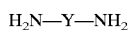

[3]

(wherein Y has the same definition as given above), and the raw material diamine is at least one compound selected from the group consisting of diaminosiloxane, 3,4'-diaminodiphenyl ether, 2,2-bis[4-(aminophenoxy)phenyl]propane, bis[4-(3-aminophenoxy)phenyl]sulfone and 2,2-bis(4-aminophenyl)-1,1,1,3,3,3-hexafluoropropane; and in the formula [7] and the formula [8], Z is derived from the raw material acid dianhydride represented by the following formula [6]:

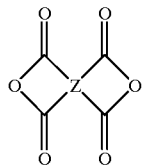

[6]

(wherein Z has the same definition as given above), and the raw material acid dianhydride is at least one compound selected from the group consisting of bicyclo[2.2.2]octo-7-ene- 2,3,5,6-tetracarboxylic acid dianhydride, 3,4,3',4'-biphenyltetracarboxylic acid dianhydride, 3,4,3',4'-benzophenonetetracarboxylic acid dianhydride and pyromellitic acid dianhydride and is soluble in any of dimethyl sulfoxide, N,N-dimethylformamide, N,N-dimethylac etamide, N-methylpyrrolidone and γ-butyrolactone.

13. A soluble polyimide resin of combined diamines according to claim 3, which has a glass transition temperature (the DSC method) of 210 to 320° C. and a 5% weight decrease temperature (the TG method) of 420 to 460° C.

14. A soluble polyimide resin of combined diamines according to claim 3, which is a random copolycondensate.

15. A soluble polyimide resin of combined diamines according to claim 3, which is a block copolycondensate.

16. A process for producing a soluble polyimide resin containing, as essential diamine units, the units represented by the following formula [1]:

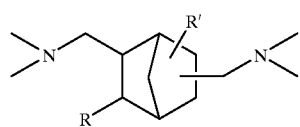

[1]

(wherein R and R' are each independently selected from a hydrogen atom, a methyl group and an ethyl group; and R' does not bond to the carbon atom to which an aminomethyl group bonds), which process comprises reacting a 2,5(or 6)-bis (aminomethyl)bicyclo[2.2.1]heptane represented by the following formula [2]:

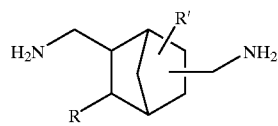

[2]

(wherein R and R' has the same definitions as given above and the position of bonding of R' is the same as mentioned above) with a tetracarboxylic acid dianhydride.

17. A process for producing a soluble polyimide resin containing the repeating units represented by the following formula [7]:

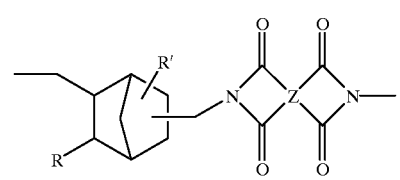

[7]

(wherein R and R' are each independently selected from a hydrogen atom, a methyl group and an ethyl group; R' does not bond to the carbon atom to which an aminomethyl group bonds; Z is a tetravalent organic group having four or more carbon atoms; and there is no case that a plurality of —CO— groups bond to one of the carbon atoms of Z), which process comprises reacting a 2,5(or 6)-bis(aminomethyl)bicyclo [2.2.1]heptane represented by the following formula [2]:

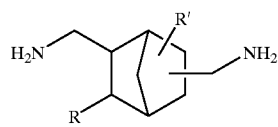

[2]

(wherein R and R' has the same definitions as given above and the position of bonding of R' is the same as mentioned above) with a tetracarboxylic acid dianhydride represented by the following formula [6]:

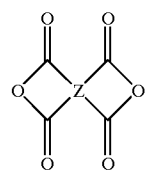

[6]

(wherein Z has the same definition as give above and there is no case that a plurality of —CO— groups bond to one of the carbon atoms of Z).

18. A process for producing a soluble polyimide resin of combined diamines containing the repeating units represented by the following formula [7]:

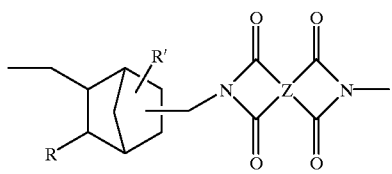
[7]

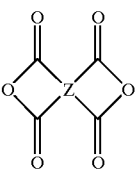
[6]

(wherein R and R' are each independently selected from a hydrogen atom, a methyl group and an ethyl group; R' does not bond to the carbon atom to which an aminomethyl group bonds; Z is a tetravalent organic group having four or more carbon atoms; and there is no case that a plurality of —CO— groups bond to one of the carbon atoms of Z) and the repeating units represented by the following formula [8]:

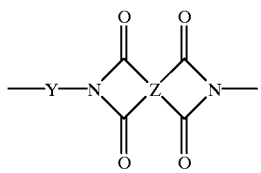
[8]

[wherein Y is at least one group selected from the group consisting of bivalent aliphatic groups, bivalent alicyclic groups other than bivalent groups represented by the following formula [4]:

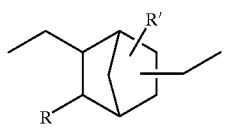
[4]

(wherein R and R' are each independently selected from a hydrogen atom, a methyl group and an ethyl group; and R' does not bond to the carbon atom to which an aminomethyl group bonds), bivalent aromatic groups and bivalent siloxane groups; Z has the same definition as given above; and there is no case that a plurality of —CO— groups bond to one of the carbon atoms of Z], which process comprises reacting:

(i) a 2,5(or 6)-bis(aminomethyl)bicyclo[2.2.1]heptane represented by the following formula [2]:

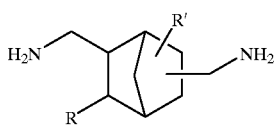
[2]

(wherein R and R' have the same definitions as give above and the position of bonding of R' is the same as mentioned above), (ii) at least one tetracarboxylic acid dianhydride represented by the following formula [6]:

(wherein Z has the same definition as given above and there is no case that a plurality of —CO— groups bond to one of the carbon atoms of Z), and (iii) a diamine represented by the following formula [3]:

$$H_2N—Y—NH_2 \qquad [3]$$

(wherein Y has the same definition as give above).

19. A process for producing a soluble polyimide resin of combined diamines according to claim 18, wherein the proportion of the repeating units of the formula [7] is 30 to 97% of the total repeating units.

20. A process for producing a soluble polyimide resin of combined diamines according to claim 18, wherein the diamine represented by the formula [3] is at least one compound selected from the group consisting of diaminosiloxane, 3,4'-diaminodiphenyl ether, 2,2-bis[4-(aminophenoxy)phenyl]propane, bis[4-(3-aminophenoxy)phenyl]sulfone and 2,2-bis(4-aminophenyl)-1,1,1,3,3,3-hexafluoropropane.

21. A process for producing a soluble polyimide resin according to claim 17, wherein the tetracarboxylic acid dianhydride is an aliphatic tetracarboxylic acid dianhydride or/and an alicyclic tetracarboxylic acid dianhydride.

22. A process for producing a soluble polyimide resin of combined diamines according to claim 18, wherein the tetracarboxylic acid dianhydride is an alicyclic tetracarboxylic acid dianhydride.

23. A process for producing a soluble polyimide resin of combined diamines according to claim 18, wherein the tetracarboxylic acid dianhydride is an alicyclic tetracarboxylic acid dianhydride and an aromatic tetracarboxylic acid dianhydride.

24. A process according to claim 17, wherein the reaction is conducted in the presence of at least one solvent selected from the group consisting of phenol type solvents and aprotic polar solvents.

25. A process according to claim 24, which uses a solvent further containing an aromatic hydrocarbon.

26. A process according to claim 17, wherein polymerization is conducted in the presence of a basic polycondensation promoter or/and an acidic polycondensation promoter.

27. A process for producing a soluble polyimide resin of combined diamines according to claim 18, wherein the 2,5(or 6)-bis(aminomethyl)bicyclo[2.2.1]heptane represented by the formula [2], the tetracarboxylic acid dianhydride represented by the formula [6] and the diamine represented by the formula [3] are reacted substantially simultaneously.

28. A process for producing a soluble polyimide resin of combined diamines according to claim 18, wherein the tetracarboxylic acid dianhydride represented by the formula [6] and the diamine represented by the formula [3] are reacted first and then the reaction product is reacted with the 2,5(or 6)-bis(aminomethyl)bicyclo[2.2.1]heptane represented by the formula [2].

29. A polyimide resin solution composition comprising, as essential components, a soluble polyimide resin according to claim 1 and an organic polar solvent.

30. A solution composition according to claim 29, wherein the organic polar solvent is at least one solvent selected from the group consisting of phenol, 4-methoxyphenol, 2,6-dimethylphenol, m-cresol, N-methylpyrrolidone, N,N-dimethylformamide, N,N-dimethylacetamide, dimethyl sulfoxide, γ-valerolactone, γ-butyrolactone, chloroform, tetrahydrofuran, cyclohexanone, dioxane, anisole, 2-methoxyethanol, methyl methoxypropionate and ethyl lactate.

* * * * *